(12) United States Patent
Charney et al.

(10) Patent No.: US 7,640,163 B2
(45) Date of Patent: Dec. 29, 2009

(54) METHOD AND SYSTEM FOR VOICE ACTIVATING WEB PAGES

(75) Inventors: Michael L. Charney, Brooklyn, NY (US); Justin Starren, Hasting-on-New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1194 days.

(21) Appl. No.: 10/432,188

(22) PCT Filed: Nov. 30, 2001

(86) PCT No.: PCT/US01/45223

§ 371 (c)(1),
(2), (4) Date: Apr. 5, 2004

(87) PCT Pub. No.: WO02/44887

PCT Pub. Date: Jun. 6, 2002

(65) Prior Publication Data

US 2004/0153323 A1 Aug. 5, 2004

Related U.S. Application Data

(60) Provisional application No. 60/250,809, filed on Dec. 1, 2000.

(51) Int. Cl.
*G10L 21/00* (2006.01)
(52) U.S. Cl. .................. 704/270.1; 704/270; 704/275; 704/9; 704/256; 704/260; 707/10; 707/4; 707/5; 707/9
(58) Field of Classification Search ......... 704/270–275, 704/270.1, 256, 231, 251, 9, 3, 260; 707/10, 707/4, 5, 9; 715/513
See application file for complete search history.

(56) References Cited

U.S. PATENT DOCUMENTS

| | | | | |
|---|---|---|---|---|
| 5,819,220 A | * | 10/1998 | Sarukkai et al. | 704/270.1 |
| 5,960,399 A | * | 9/1999 | Barclay et al. | 704/270.1 |
| 6,088,675 A | * | 7/2000 | MacKenty et al. | 704/270 |
| 6,115,686 A | * | 9/2000 | Chung et al. | 704/260 |

(Continued)

FOREIGN PATENT DOCUMENTS

EP 0854418 7/1998

(Continued)

OTHER PUBLICATIONS

Frost, "Speechnet: a Network of Hyperlinked Speech-Accessible Objects," International Conference on Advance Issues of E-Commerce and Web-Based Information Systems, WECWIS, Apr. 8-9, 1999, pp. 116-121.

(Continued)

*Primary Examiner*—Vijay B Chawan
(74) *Attorney, Agent, or Firm*—Kenyon & Kenyon LLP

(57) ABSTRACT

A method for providing a web page having an audio interface. The method including providing data specifying a web page, including in the data a first rule based grammar statement having a first phrase portion, a first command portion and a first tag portion, and including in the data a second rule based grammar statement having a second phrase portion, a second command portion, and a second tag portion.

42 Claims, 13 Drawing Sheets

U.S. PATENT DOCUMENTS

| | | | |
|---|---|---|---|
| 6,313,854 B1 | 11/2001 | Gibson | |
| 6,385,583 B1 * | 5/2002 | Ladd et al. | 704/270 |
| 6,411,952 B1 * | 6/2002 | Bharat et al. | 707/5 |
| 6,418,439 B1 * | 7/2002 | Papierniak et al. | 707/9 |
| 6,532,444 B1 * | 3/2003 | Weber | 704/257 |
| 6,587,822 B2 * | 7/2003 | Brown et al. | 704/275 |
| 6,604,075 B1 * | 8/2003 | Brown et al. | 704/270.1 |
| 6,604,077 B2 * | 8/2003 | Dragosh et al. | 704/270.1 |
| 6,965,864 B1 * | 11/2005 | Thrift et al. | 704/275 |
| 7,020,609 B2 * | 3/2006 | Thrift et al. | 704/270.1 |
| 7,260,530 B2 * | 8/2007 | Werner | 704/251 |
| 2001/0034603 A1 * | 10/2001 | Thrift et al. | 704/270.1 |
| 2002/0002463 A1 * | 1/2002 | Kroeker et al. | 704/270.1 |
| 2002/0010715 A1 * | 1/2002 | Chinn et al. | 707/514 |
| 2002/0032564 A1 * | 3/2002 | Ehsani et al. | 704/235 |
| 2002/0077823 A1 * | 6/2002 | Fox et al. | 704/260 |
| 2002/0146015 A1 * | 10/2002 | Bryan et al. | 370/401 |
| 2002/0178344 A1 * | 11/2002 | Bourguet et al. | 712/1 |
| 2003/0078973 A1 | 4/2003 | Przekop et al. | |

FOREIGN PATENT DOCUMENTS

| | | |
|---|---|---|
| WO | 99/48088 | 9/1999 |
| WO | 00/05643 | 2/2000 |
| WO | 00/05708 | 2/2000 |

OTHER PUBLICATIONS

Charney et al., "Use of the Java Speech Api for Development of an Automated Radiology Reporting System,'" American Medical Informatics Association Symposium, Nov. 6-10, 1999.

W3C "Grammar Representation Requirements for Voice Markup Languages," http://www.w3.org/tr/voice-grammarreqs, Dec. 23, 1999.

Goose et al. "Enhancing Web Accessibility Via the Vox Portal and a Web-Hosted Dynamic HTML<->VoxML Converter," Computer Networks, vol. 33, No. 1-6, Jun. 2000, pp. 583-592.

* cited by examiner

250

| | Current Page has Grammar | Previous Page had Grammar | How Current Page Initiated | First Directive | Second Directive | Append/Prepend |
|---|---|---|---|---|---|---|
| 364 | Yes | Yes | Voice | Nothing | Boundary | After |
| 366 | Yes | Yes | Mouse Click | Header | Boundary | Before |
| 368 | Yes | No | Voice | Header | Boundary | Before |
| 370 | Yes | No | Mouse Click | Header | Boundary | Before |
| 372 | No | Yes | Voice | Footer | Close Socket | After |
| 374 | No | Yes | Mouse Click | Nothing | Nothing | N/A |
| 376 | No | No | Voice | Nothing | Nothing | N/A |
| | No | No | Mouse Click | Nothing | Nothing | N/A |

METHOD AND SYSTEM FOR VOICE ACTIVATING WEB PAGES

CROSS REFERENCE TO RELATED PRIORITY APPLICATIONS

This application claims priority to International Application Serial No. PCT/US01/45223, filed Nov. 30, 2001, which claims priority to U.S. Provisional Patent Application entitled "Hyper-Speech Markup Language/Hyper-Voice Markup Language (HSML/HVML), A Technology for Voice Activating Visual Web Pages," Ser. No. 60/250,809, filed on Dec. 1, 2000, which is hereby incorporated by reference into this application in its entirety.

BACKGROUND OF THE INVENTION

Over the past decade Automated Speech Recognition (ASR) systems have progressed to the point where a high degree of recognition accuracy may be obtained by ASR systems installed on moderately priced personal computers and workstations. This has led to a rise in the number of ASR systems available for consumer and industry applications.

ASR systems rely on voice grammars to recognize vocal commands input via a microphone and act on those commands. Voice grammars fall into two categories: rule based grammars and free speech grammars. Rule based grammars allow the recognition of a limited set of predefined phrases. Each rule based grammar, if invoked, causes an event or set of events to occur. A rule based grammar is invoked if an utterance, input via a microphone, matches a speech template corresponding to a phrase stored within the set of predefined phrases. For example the user may say "save file" while editing a document in a word processing program to invoke the save command. On the other hand, free speech grammars recognize large sets of words in a given domain such as Business English. These grammars are generally used for dictation applications, some examples of these systems are Dragon Naturally Speaking and IBM Viavoice 7 Millennium. ASR systems have also incorporated text to speech (TTS) capabilities which enable ASR systems to speak graphically rendered text using a synthesized voice. For example, an ASR system can read a highlighted paragraph within a word processor aloud through speakers.

ASR systems have been integrated with web browsers to create voice enabled web browsers. Voice enabled web browsers allow the user to navigate the Internet by using voice commands which invoke rule based grammars. Some of the voice commands used by these browsers include utterances that cause the software to execute traditional commands used by web browsers. For example if the user says "home" into a microphone, a voice enabled browser would execute the same routines that the voice enabled web browser would execute if a user clicked on the "home" button of the voice enabled web browser. In addition, some voice enabled web browsers create rule based grammars based on web page content. As a web page is downloaded and displayed some voice enabled web browsers create rule based grammars based on the links contained within the web page. For example, if web page displayed a link "company home," such a voice enabled web browser would create a rule based grammar, effective while the web page is displayed, such that if a user uttered the phrase "company home" into a microphone the voice enabled web browser would display the web page associated with the link. One shortcoming of this approach is that the rules generated from web page content are fixed over long periods of time because web pages are not redesigned often. Additionally, the rule based grammars are generated from web page content, which is primarily intended for visual display. In effect, these systems limit the user to saying what appears on the screen.

Web pages can also incorporate audio elements, which cause sound to be output. Currently web pages can incorporate audio elements into their web pages in two ways. The first way to incorporate an audio element is to use audio wave file content to provide a human sounding voice to a web page. Using audio wave files allows the web page designer to design the visual and audio portions of the web page independently, but this freedom and added functionality comes at a high price. The bandwidth required to transfer binary sound files over the Internet to the end user is large. The second way to incorporate an audio element is to leverage the functionality of an ASR system. Voice enabled web browsers may utilize the ITS functionality of an ASR system in such a way as to have the computer "speak" the content of a web page. Using this approach causes the bandwidth needed to view the page with or without the audio element be approximately the same but limits the subject matter of what the web browser can speak to the content of the web page.

Voice XML (VXML) affords a web page designer with another option. VXML allows a user to navigate a web site solely through the use of audio commands typically used over the phone. VXML requires that a TTS translator read a web page to a user by translating the visual web page to an audio expression of the web page. The user navigates the web by speaking the links the user wants to follow. With this approach a user can navigate the Internet by using only the user's voice, but the audio content is typically generated from web page content that is primarily designed for visual interpretation; and the visual interface is removed from the user's experience.

Accordingly, there exists a continuing need to independently create an audio component of a web page that does not demand a large amount of transmission bandwidth and exists in conjunction with the visual component of a web page.

SUMMARY OF THE INVENTION

The present invention in one aspect is a method for creating an audio interface for a visual web page. In accordance with a first exemplary embodiment of the method of the present invention, there is provided a method for providing a web page having an audio interface, including providing data specifying a web page; including in the data a first rule based grammar statement having a first phrase portion, a first command portion and a first tag portion; and including in the data a second rule based grammar statement having a second phrase portion, a second command portion, and a second tag portion.

According to a second exemplary embodiment of the method of the present invention, a method for receiving a web page having an audio interface, including receiving data specifying a web page, the data including a first rule based grammar statement having a first phrase portion, a first command portion and a first tag portion, and a second rule based grammar statement having a second phrase portion, a second command portion, and a second tag portion; storing at least a portion of the first rule based grammar; storing at least a portion of the second rule based grammar, providing the data specifying the web page to a web browser, providing the first phrase portion and the first tag portion as a first recognition grammar to an automated speech recognition engine; and providing the second phrase portion and the second tag portion as a second recognition grammar to the automated speech recognition engine.

In another aspect of the present invention there is provided a system for receiving a web page having an audio interface. According to an exemplary embodiment of the system of the present invention, there is provided a first input for receiving data specifying a web page, the data including a first rule based grammar statement having a first phrase portion, a first command portion, and a first tag portion, and including a second rule based grammar statement having a second phrase portion, a second command portion, and a second tag portion; a database for storing at least a portion of the first rule based grammar statement and for storing at least a portion of the second rule based grammar statement; a web browser for receiving the data specifying the web page; and an automated speech recognition engine for receiving the first phrase portion and the first tag portion as a first recognition grammar, and for receiving the second phrase portion and the second tag portion as a second recognition grammar.

BRIEF DESCRIPTION OF THE DRAWINGS

Further objects, features, and advantages of the invention will become apparent from the following detailed description taken in conjunction with the accompanying figures showing illustrative embodiments of the invention, in which:

FIG. 3B is a table illustrating the conditions under which a header, boundary, or footer are appended or prepended to the data received from the web server in accordance with the present invention;

Figure 1:
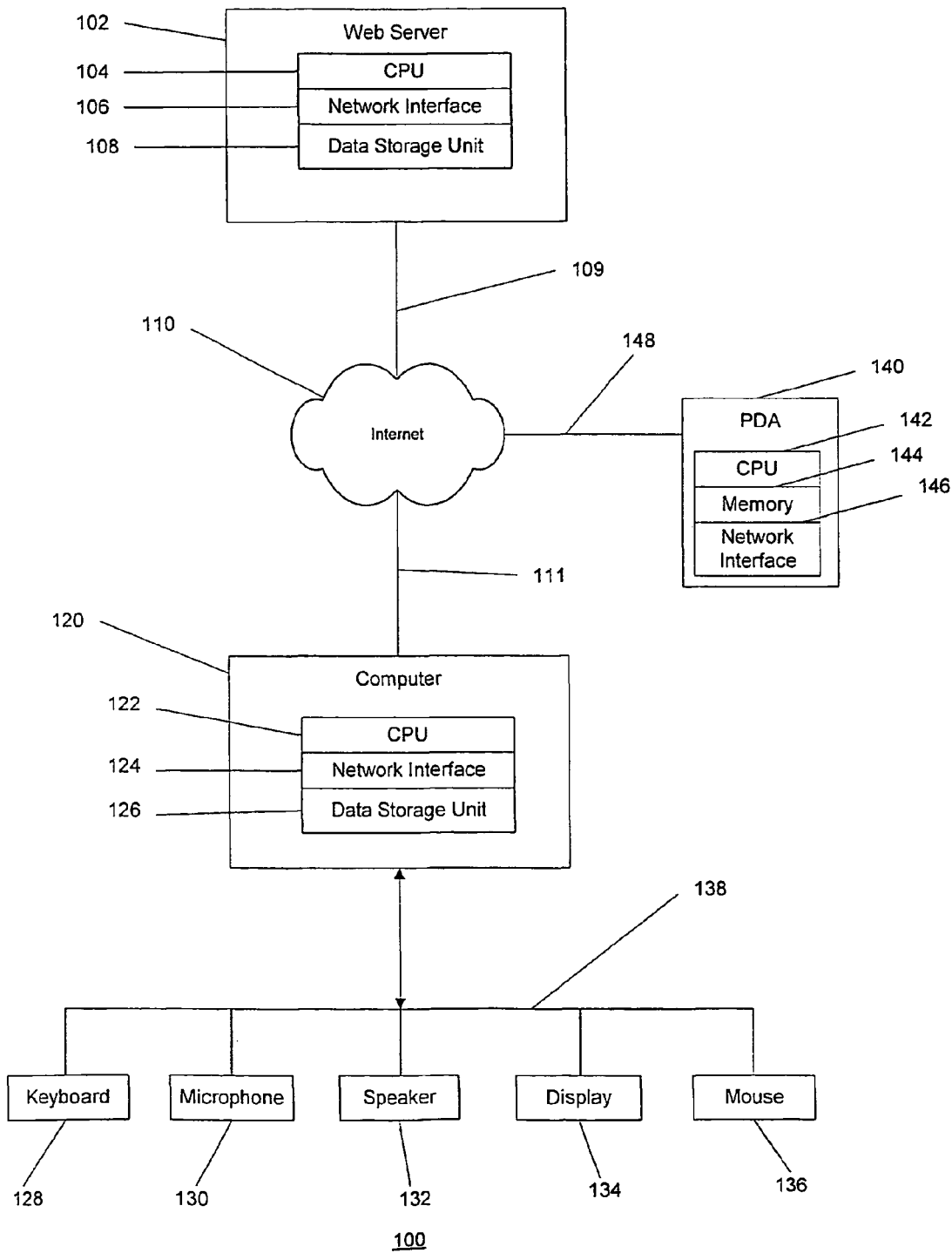
FIG. 1 is a block diagram illustrating a prior art system.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrative embodiments, various changes, modifications, alterations and substitutions to the described embodiments will be apparent to those skilled in the art without departing from the true scope and spirit of the subject invention as defined by the appended claims.

DETAILED DESCRIPTION OF THE INVENTION

FIG. 1 illustrates a prior art system 100 for viewing and interacting with web pages stored on a web server 102. The web server 102 including a CPU 104, a network interface 106, and a data storage unit 108 is provided. The data storage unit 108 contains information describing one or more web pages. A network connection 109 connects the web server 102 to a communications network 110 via the network interface 106 allowing the web server 102 to communicate with other devices on the communications network 110. In a certain embodiment, the communications network 110 is the Internet.

A client computer 120 including a CPU 122, a network interface 124, and a data storage unit 126 is provided. In a certain embodiment, the data storage unit 126 can be memory. A network connection 111 connects the client computer 120 to the communications network 110 via the network interface 124 allowing the client computer 120 to communicate with other devices on the communications network 110. The client computer 120 is also connected to various input/output devices such as a keyboard 128, a mouse 136, a microphone 130, a speaker 132, and a display 134 typically through a system bus 138.

A personal digital assistant (PDA) 140, including a CPU 142 and a memory 144, is also provided. The PDA 140 is connected to and can communicate with other devices on the communications network 110 over a network connection 148, through a network interface 146.

In order to view a web page a user opens a web browser, stored in a data storage unit in a computer or a memory in a PDA, for example the data storage unit 126 in the client computer 120. Once the web browser is open the user may key in a universal resource locator (URL) which causes the client computer 120 to issue a request over the communications network 110 for the data files describing the contents of the web page identified by the URL. A web server, which stores the data files for the web page identified by the URL, for example the web server 102, receives the request and sends the client computer 120 the data files which describe the contents of the web page. The data files may include hypertext markup language (HTML) files, active server pages files, sound files, video files, etc. The web browser then displays the web page and plays any video or audio files on the client computer 120 as specified by the markup language. The markup language specifies where and when to place or play text, video, or audio content.

Figure 2A:
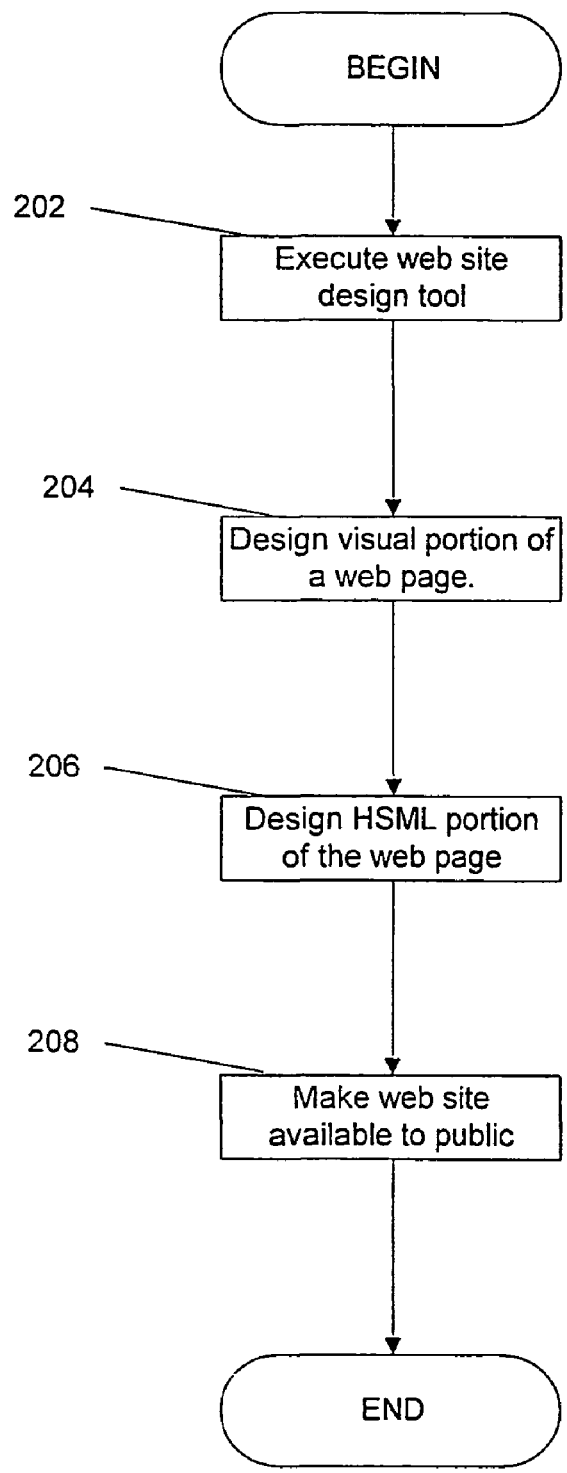
FIG. 2A is a flow chart illustrating a process of web page content generation in accordance with the present invention.

FIG. 2A depicts a process 200 for designing a web page. The process 200 begins with a web page designer executing a web page design tool at step 202. The web page design tool assists the web page designer during the process of designing a web page. The web page design tool allows the web page designer to specify elements of the web page at a high level, then generates low level markup language based on the specified elements of the web page.

The web page designer begins designing and testing the visual portion of a web page at step 204. If the visual portion of the web page already exists and does not need to be updated, the process 200 advances directly to step 206.

Designing and testing the visual portion of the web page is well known in the art. After the visual portion of the web page is designed and tested, the process block 206 is executed.

At step 206, the process of designing and testing an audio portion of the web page takes place. The web page designer may add hyper-speech markup language (HSML) to the web page markup language to augment the visual portion of the web page with an audio component. The web page designer may add HSML directly or specify it at a high level using a web page design tool. If the audio portion of the web page already exists and does not need to be updated, the process 200 advances directly to step 208. At step 208, the web pages can be made available to users connected to the communications network 110. Once the web pages are made available to the public, the process 200 ends.

In an alternate embodiment, the audio portion of the web page could be designed before the visual portion of the web page is designed. In another alternate embodiment, the audio and visual portions of the web page could be designed at the same time. In yet another alternate embodiment, the audio and visual portions of the web page could be designed in lock step with each other.

In an alternate embodiment, the audio and visual portions of the web page may be generated by a common gateway interface.

According to the present invention, HSML specifies speech recognition rule based grammars and TTS grammars for the web page. Speech recognition rule based grammars allow the recognition of a limited set of predefined speech phrases input to the computer through a microphone or the like which in turn invoke an event or set of events. TTS grammars define text that can be output as audible content through speakers associated with the computer displaying a web page.

HSML rule based grammars may be related to, but need not be the same as, the text which appears on the screen. If HSML rule based grammars are added to the markup language of a web page that is displayed on the screen, users may speak about the text displayed on the screen rather then simply speaking the text, displayed on the screen, itself. A first exemplary HSML rule based grammar follows: <hsml:JSGFRule href="http://www.columbia.edu" tag="reload" ID="reload"><! [CDATA[public <reload>=(reload) {reload}]]></hsml:JSGFRule>. The first exemplary HSML rule based grammar defines a command, "http://www.columbia.edu", to be executed if a speech phrase input to the computer matches the phrase "reload."

Each HSML rule based grammar has three portions which can be configured: the command portion, the tag portion, and the phrase portion. The command portion defines the command to be executed once the HSML rule based grammar is invoked. In the first exemplary HSML rule based grammar, the command portion is as follows: href="http://www.columbia.edu". The command for the first exemplary HSML rule based grammar is "http://www.columbia.edu". The tag portion defines a unique way of identifying the particular HSML rule based grammar rule. In the first exemplary HSML rule based grammar, the tag portion is as follows: tag="reload". The tag for the first exemplary HSML rule based grammar is "reload". The phrase portion defines the set of phrases that will invoke the HSML rule based grammar. In the first exemplary HSML rule based grammar, the phrase portion is as follows: "CDATA[public <reload>=(reload) {reload}". The phrase for the first exemplary HSML rule based grammar is "reload".

Another, more complicated, set of HSML rule based grammars is as follows: <hsml:block> <hsml:JSGFRule href="http://www.columbia.edu/scripts/cgi/test.cgi" tag="examprep" ID="examprep"><![CDATA[public <examprep>=[please] (go to | example) (<rad> | <lab>) report {examprep};]]></hsml:JSGFRule> <hsml: JSGFRule tag="RAD"><![CDATA[public <rad>=radiology {RAD};]]> <hsml: JSGFRule <hsml:JSGFRule tag="LAB"><![CDATA public <lab>= (laboratory|chemistry) {LAB};]]></hsml:JSGFRule></hsml:block>. This grammar provides a nested set of rules. This HSML rule based grammar defines a set of commands, one of which will be executed if a speech phrase input to the computer matches an associated one of a set of phrases. The top level command is defined by the HSML rule "<hsml:JSGFRule href="http://www.columbia.edu/scripts/cgi/test.cgi" tag="examprep" ID="examprep"> <![CDATA[public <examprep>=[please] (go to | example) (<rad>|<lab>) report {examprep};]]></hsml:JSGFRule>", which defines the set of phrases and the top level command "http://www.columbia.edu/scripts/cgi/test.cgi".

The set of phrases is defined by the following portion of the phrase portion of the second exemplary HSMIL rule based grammar: [please] (go to | example) (<rad>|<lab>). The phrase starts off with the word "please" within square brackets. A word within square brackets denotes an optional word. The rule will be invoked whether or not the speech phrase begins with the word "please."

The optional "please" is followed by (go to | example). The parentheses group words together. The words "go to" and "example" are separated by an "|" symbol. The "|" symbol is an "OR" symbol, which indicates that either "go to" or "example" may be used to invoke the rule. Therefore the optional word "please" must be followed by "go to" or "example" to invoke this HSML rule.

The mandatory words "go to" or "example" are followed by (<rad>|<lab>). This portion of the phrase contains variables. The variables are defined in sub-rules elsewhere within the HSML block. The variable <rad> is defined by the sub-rule <hsml: JSGFRule tag="RAD"><! [CDATA[public <rad>=radiology {RAD};]]> </hsml: JSGFRule>. Therefore the variable <rad> is defined as radiology. If the word "radiology" follows either "go to" or "example," a separator, here an "?", is concatenated onto the top level command then the sub-rule tag RAD is concatenated onto the top level command, such that the command becomes "http://www.columbia.edu/scripts/cgi/test.cgi?RAD". In an alternate exemplary embodiment, the separator can be a "/". The variable <lab> is defined by the sub-rule <hsml:JSGFRule tag="LAB"> <![CDATA[public <lab>=(laboratory | chemistry) {LAB};]] ><hsml:JSGFRule>. The variable <lab> is defined as "laboratory" or "chemistry." If the word "laboratory" or "chemistry" follows either "go to" or "example," a separator, here an "?", is concatenated onto the top level command then the sub-rule tag LAB is concatenated onto the end of the top level command, such that the command becomes "http://www.columbia.edu/scripts/cgi/test.cgi examprep?LAB".

TTS grammars define text which can be output as synthetic speech through speakers. One such HSML TTS grammar is as follows: <hsml:JSML> <! [CDATA[reloading]]> </hsml:JSML>. This TTS grammar provides for outputting the phrase "reloading" as synthetic speech through speakers. The TTS grammar can be invoked when an HSML rule based grammar is invoked, when a page is loaded, when a web site is loaded, when a page is exited, or when a web site is exited.

Figure 2B:
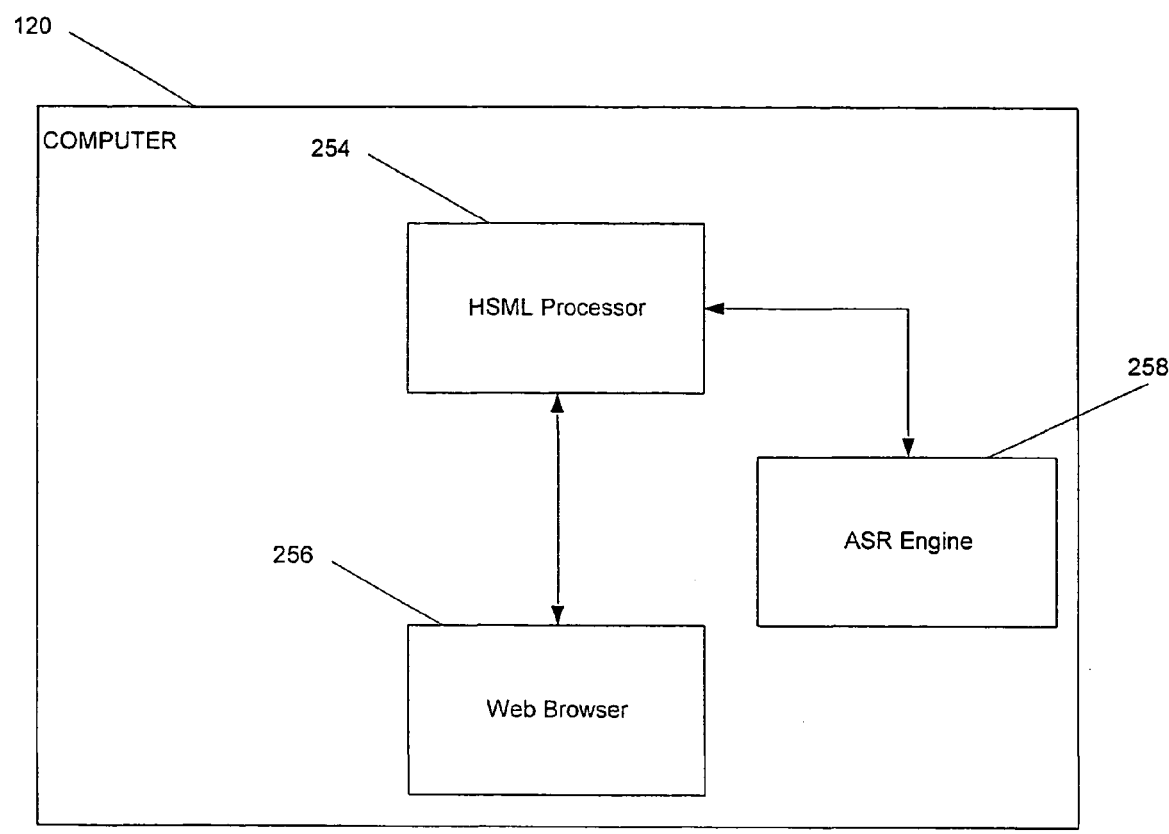
FIG. 2B is a block diagram of a hyper-speech markup language (HSML) enabled web browser system in accordance with the present invention.

FIG. 2B illustrates a functional block diagram of a system 200 for viewing and interacting with web pages having HSML content. In order to view a web page having HSML content, a user can execute an HSML processor 254, which in turn executes a web browser 256 and an ASR engine 258 on the computer 120. The HSML processor 254 acts as a proxy for the web browser 256. The web browser 256 should have all caching disabled and should support x-mixed replace markup. In an exemplary embodiment, the web browser 256 can be Netscape Navigator. In the present exemplary embodiment the ASR engine 258 can be IBM Viavoice Version 7 Millennium. Other ASR engines that conform to the Java Speech Application Program Interface standard may also be substituted for IBM Viavoice Version 7 Millennium. In a certain embodiment, a script can be used to executed the HSML processor 254 and the web browser 256 individually.

In an alternate embodiment, the web browser 256 can be Microsoft Internet Explorer. In another alternate embodiment, the HSML processor 254 communicates with the web browser 256, such that x-mixed replace markup is not needed to convey control information.

A visual monitor may also be included with the voice enabled browser. The visual monitor aids in the user's interaction with voice activated pages. The visual monitor advantageously includes a status bar displaying an output audio level, an input audio level, a speech engine status indicator, a speech synthesis indicator, a rule identifier, a data status indicator, an error indicator, a page grammar active line, an active grammars area, etc. This allows the user to receive feedback as to how or why his or her speech is or is not recognized. The visual monitor can be implemented in a window separate from the browser or it can be integrated as part of the browser itself. This monitor extends the browser media environment from a graphical and text content environment to a cross platform, dynamically generated, graphical, text and voice interactive environment The output audio level informs the user of the setting of the output volume. The input audio level indicates the current volume of the user's voice as the user speaks into the microphone 130 (shown in FIG. 1). The speech engine status indicator informs the user as to the status of the HSML processor 254. The HSML processor 254 can be listening, sleeping or off. If the HSML processor 254 is listening, it is accepting all system and page commands. If the HSML processor 254 is sleeping, it is waiting for a specific system command "wake up" to activate the HSML processor 254 which will cause the speech engine status indicator to change to listening. If the HSML processor 254 is off, no speech commands are accepted. The speech synthesis indicator informs the user whether the HSML processor 254 will react to the HSML TTS grammars associated with the active web page and the system commands, only the system speech output commands, or no speech output commands. The rule identifier displays an invoked HSML rule for a short time after the HSML grammar has been invoked. The data status indicator informs the user whether the HSML processor 254 is loading data, whether the HSML processor 254 is loading speech data, whether the HSML processor 254 has already loaded the visual portion of the web page, or whether the HSML processor 254 has already loaded the web page and speech data. The error indicator informs the user of any error that have been detected by the HSML processor 254. The page grammar active line informs the user whether a current page grammar exists and is active. The active grammars area lists the HSML grammar rules that are currently active up to a certain maximum number of HSML grammars. The appearance of these rules in the active grammars area allows users to easily understand the function and layout of a page.

The entire sets of rules for large rule sets do not need to be displayed in their entirety. A graphical menu does not need to name every HSML rule or HSML rule based grammar. The individual HSML rules or the HSML grammars can indicate the importance level for each rule or grammar such that the visual monitor can intelligently select which rules and grammars are important and should be displayed. When a rule is displayed, the display shows the phrase or phrases that would invoke the rule. For example, if the HSML rule based grammar <hsml:block> <hsml:JSGFRule href="http://www.columbia.edu" tag="reload" ID="reload"! [CDATA[public <reload>=(reload) {reload}]]</hsml:JSGFRule></hsml:block> was displayed, the display would show the phrase "reload". If more than one phrase could invoke the HSML rule based grammar, the display shows all the phrases that could invoke the HSML rule based grammar. In an alternate embodiment, the display shows the phrases that could invoke the HSML rule based grammar, but does not display optional words. For example, if the phrase "please reload" invoked an HSML rule based grammar, but the word please was optional, the display would only display the phrase "reload", not "please reload" and "reload".

In an alternate embodiment, the HSML processor 254 can be executed separately from the web browser 256, and can interact with a web browser that is already running.

A request for a web page may be initiated by the ASR engine 258 in conjunction with the HSML processor, or the web browser 256. If the ASR engine 258 initiates the request at least one speech recognition rule based grammar will have been invoked in the ASR engine 258. The ASR engine 258 transmits an array of tags to the HSML processor 254, which in turn issues a request to the web server 102 (shown in FIG. 1). This process is shown in more detail in FIGS. 3A, 3B and 5. Referring to FIG. 2B, the web browser 256 initiates the request, it transmits the URL to the HSML processor 254. The HSML processor 254 receives the URL from the web browser 256 and issues a request to the web server 102 (shown in FIG. 1). This process is shown in more detail in FIGS. 3A, 3B and 4.

The computer 120 (shown in FIG. 1) receives a response to the request issued by the HSML processor 254 in the form of data representing the web page corresponding to the URL. The computer 120 communicates the data, including markup data, representing the web page corresponding to the URL to the HSML processor 254. The HSML processor 254 processes the markup data and creates, stores and transmits to the ASR engine 258 the rule based grammars and TTS grammars based on the markup data. The process of creating, storing and sending rule based grammars and ITS grammars is described in more detail below in reference to FIGS. 3A and 3B.

In an alternate embodiment, the functionality of the HSML processor 254 may be incorporated into the web browser 256. In another alternate embodiment, the functionality of the HSML processor 254 may be incorporated into the web browser 256 as a module or subroutines. In yet another alternate embodiment, the functionality of the ASR engine 258 may be incorporated into the web browser 256.

Figure 3A:
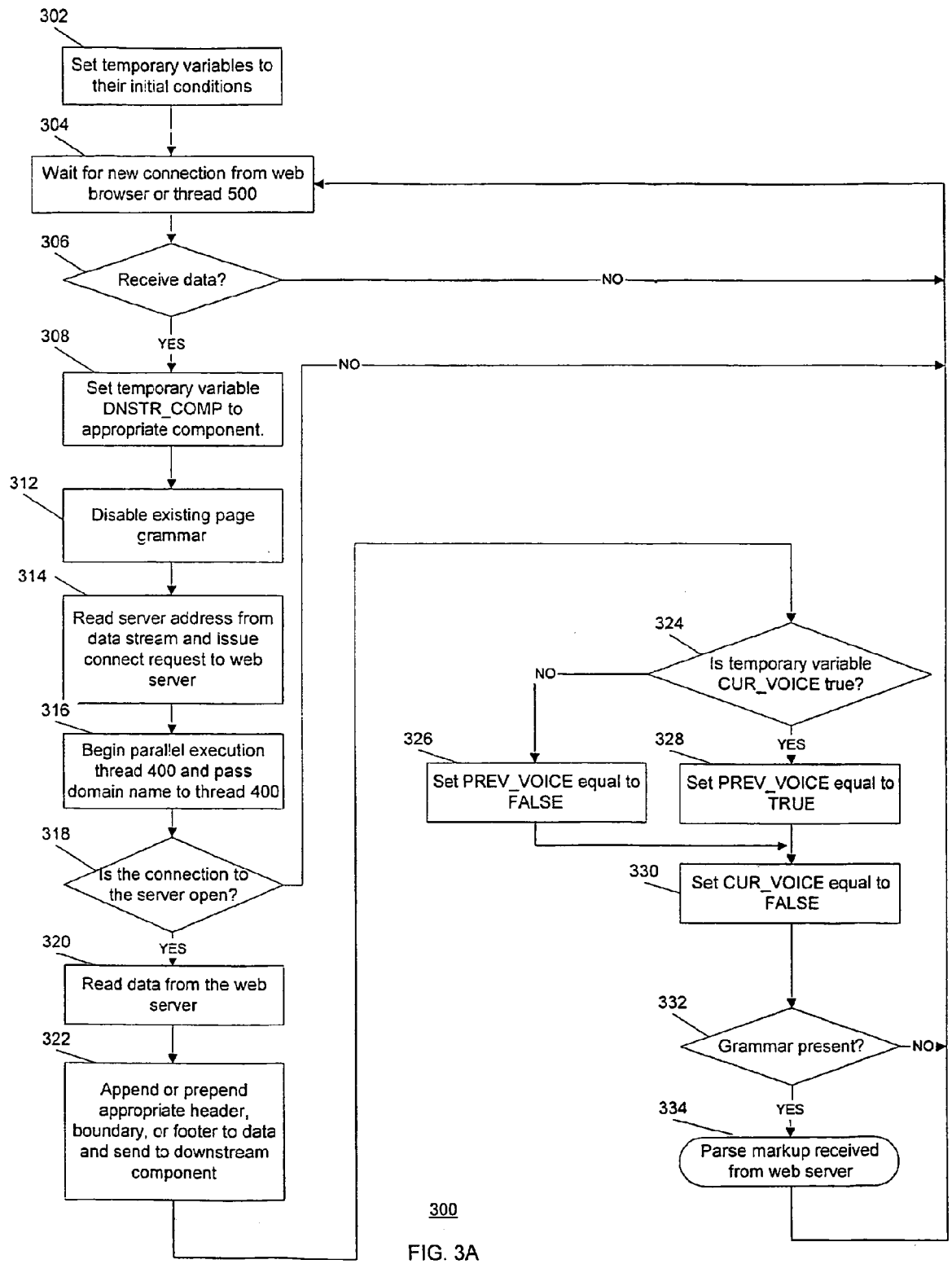
FIG. 3A is a flow chart illustrating a thread that monitors messages sent to a particular port of a computer in accordance with the present invention.

FIG. 3A illustrates a thread 300 that monitors messages sent to a particular port of a computer. A thread is not an independent process, but is a thread of execution that belongs to a particular process; here the thread 300 belongs to the HSML processor 254. A single process may have multiple threads. The thread 300 monitors the particular port for a new connection from either the web browser 256 or a thread 400 of the HSML processor 254, shown in FIG. 5. Once the thread 300 receives the new connection from either the web browser 256 or the thread 500, the thread 300 determines whether the new connection includes a data stream. If the new connection includes a data stream, the thread 300 reads the server address from the data stream and issues a request to the web server 102 (shown in FIG. 1). After the request is issued, the thread 300 waits for the data describing the web page from the web server. If the thread 300 receives data from the web server, the thread 300 processes the data extracting any HSML grammars and transmitting the data to the web browser 256.

The thread 300 begins at step 302 where the thread 300 initializes a recognizer, a temporary variable PREV_VOICE and a temporary variable CUR_VOICE. The thread 300 uses a class library called International Business Machines Java Speech Library (IBMJS Library), version 1.0, which is an implementation of the Java Speech Application Program Interface standard, to interface with the ASR engine 258. In an alternate embodiment, the thread 300 may cause a class library other than IBMJS to communicate with the ASR engine. Other class libraries that conform to the Java Speech Application Program Interface standard may also be substituted for the IBMJS Library. The thread 300 initializes the recognizer using the method createrecognizer of a class used to implement the IBMJS Library interface Recognizer. After the recognizer is initialized, the temporary variable PREV_VOICE is initialized to FALSE, and the temporary variable CUR_VOICE is initialized to FALSE. Once the temporary variables are initialized the thread 300 advances to step 304.

Figure 5:
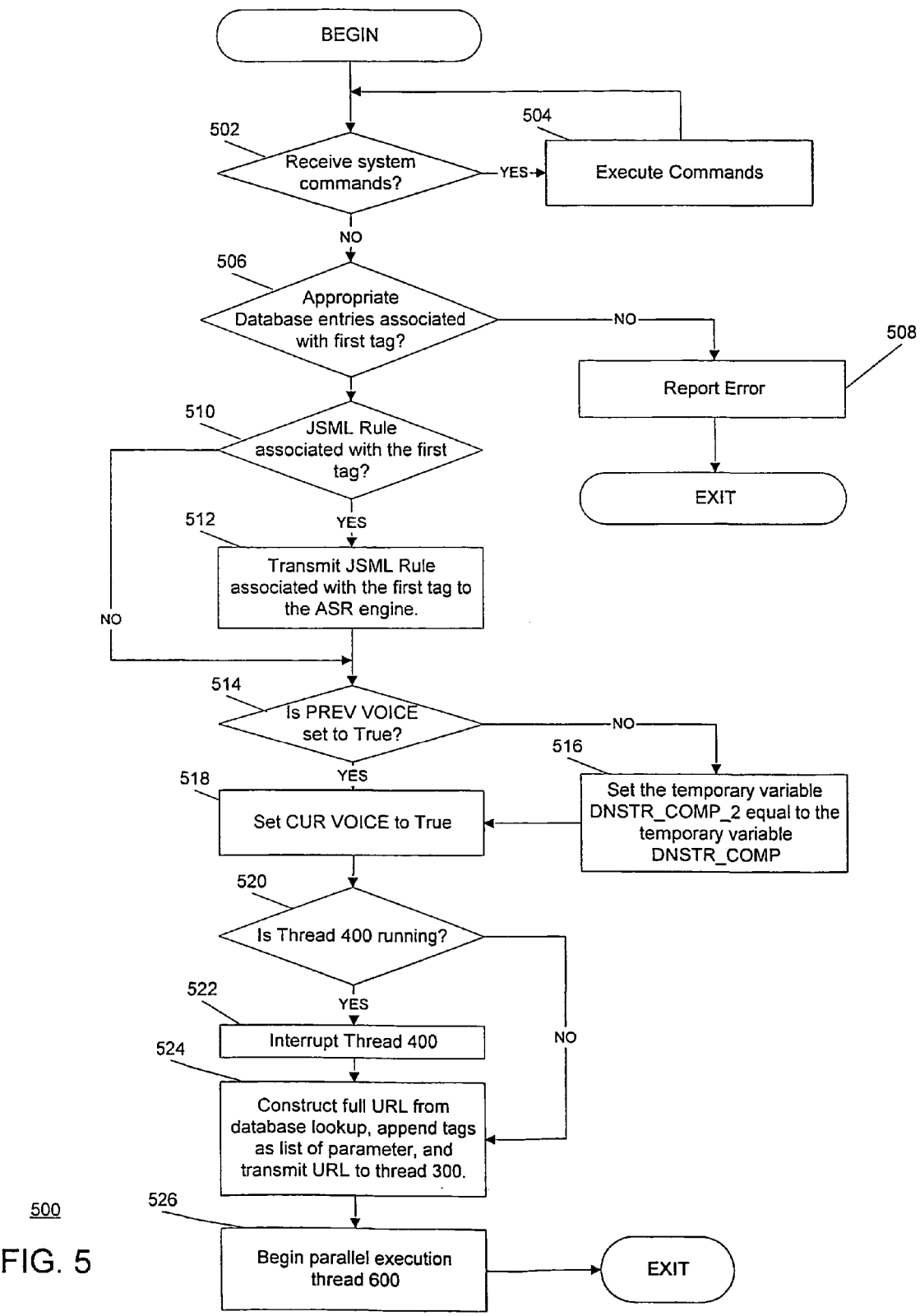
FIG. 5 is a flow chart illustrating a thread which is the method through which the HSML engine reacts to receiving an array of tags from the ASR engine in accordance with the present invention.

At step 304, the thread 300 waits for a new connection from the web browser 256 (shown in FIG. 2B) or a thread 500 (shown in FIG. 5). The thread 500 is described in greater detail in relation to FIG. 5. The new connection received by the thread 300 will be a data stream. Once the thread 300 receives a new connection from the web browser 256 or the thread 500, the thread 300 advances to step 306.

At step 306, the thread 300 determines if it has received any data from the new connection. If the thread 300 has received data, the thread 300 advances to step 308. If the thread 300 has not received data, the thread 300 advances to step 304.

At step 308, the thread 300 sets a temporary variable DNSTR_COMP to an appropriate value. The temporary variable DNSTR_COMP should be set equal a value representing the socket associated with the web browser 256 or the thread 500 that initiated the new connection with the thread 300. Having the value of the socket associated with the initiator of the new connection with the thread 300 allows the thread 300 to transmit data to and read data from the initiator of the new connection. Once the temporary variable DNSTR_COMP is set, the thread 300 advances to step 312.

At step 312, the thread 300 disables the current rule based grammars and TTS grammars within the ASR engine 258 (shown in FIG. 2B). Rule based grammars that are associated with any web page and specified in the ASR engine 258 are disabled using a method deleteRuleGrammar of the instance recognizer of a class implementing the IBMJS Library interface Recognizer. Once the existing grammars are disabled, the thread 300 advances to step 314.

At step 314, the server address is read from the data stream received by the thread 300 during the new connection. After the server address is read from the data stream, the thread 300 formats and issues a connection request to the web server 102 (shown in FIG. 1) specifying the server address Once the request is sent to the web server 102, the thread 300 advances to step 316.

At step 316, the thread 300 begins the parallel execution of a separate thread 400 of the HSML processor 254. The thread 400 is described in greater detail with reference to FIG. 4. As the thread 300 begins the execution of the thread 400, the thread 300 passes the server name read from the data stream to the thread 400. Once the server name is passed to the thread 400, the thread 300 advances to step 318.

At step 318, the thread 300 determines whether the connection to the web server 102 (shown in FIG. 1) is open. In order to read from the web server 102 the connection has to be open. The thread 300 performs a read from the web server 102. If an error is returned, the connection is closed; otherwise the connection is open. If the connection to the web server is open, the thread 300 advances to step 320. If the connection to the web server is not open, the thread 300 advances to step 304.

At step 320, the thread 300 performs a read from the web server 102 (shown in FIG. 1). The thread 300 receives the data describing the requested web page during the read from the web server 102. Once the thread 300 performs the read from the web server 102, the thread 300 advances to step 322.

At step 322, the thread 300 appends or prepends the appropriate header, boundary, or footer to the data read from the web server 102 and sends the information including an appropriate header, boundary or footer to the socket defined by the temporary variable DNSTR_COMP. The conditions under which the thread 300 appends or prepends a header, boundary, or footer are graphically illustrated in a table 350 illustrated in FIG. 3B. Referring to FIG. 3B, the table 350 includes a group of columns: a current page column 352, a previous page column 354, a current page initiation column 356, a first directive column 358, a second directive column 360, and an append/prepend column 361. The table 350 also includes a group of entries: a first entry 362, a second entry 364, a third entry 366, a fourth entry 368, a fifth entry 370, a sixth entry 372, a seventh entry 374, and an eighth entry 376.

The entries in the current page column 352 can be either a Yes or a No. Having a Yes in the current page column 352 indicates that the current page includes at least one HSML grammar. Having a No in the current page column 352 indicates that the current page does not include any HSML grammars.

The entries in the previous page column 354 can be either a Yes or a No. Having a Yes in the previous page column 354 indicates that the previous page includes at least one HSML grammar. Having a No in the previous page column 354 indicates that the previous page does not include any HSML grammars.

The entries in the current page initiation column 356 can be either Voice or Mouse Click. Having Voice in the current page initiation column 356 indicates that the current page was initiated by a grammar rule. Having Mouse Click in the current page initiation column 356 indicates that the current page was initiated by a mouse click.

The entries in the first directive column 358 and the second directive column 360 can have values equal to Header, Boundary, Footer, Close Socket, and Nothing. Each value stored in the first directive column 358 and the second directive column 360 indicate a particular directive that the thread 300 must transmit to the downstream component specified by the temporary variable DNSTR_COMP. The directive specified in the first directive column 358 should be transmitted before the directive specified in the second directive column 360. For example, the first entry 362 indicates that if the current page has a grammar, the previous page has a grammar and the current page was initiated by voice, a boundary then nothing should be appended to the data before it is transmitted to the downstream component specified by the temporary variable DNSTR_COMP.

A header, as specified in the first directive column 358 of the second entry 364, the third entry 366, and the fourth entry 368 is a hyper-text transfer protocol (HTTP) header. The HTTP header should include an initial boundary. The HTTP header defines the start of x-mixed replace data. An exemplary HTTP header follows:

HTTP/1.1 200
Content-Type: multipart/x-mixed-replace;boundary=123456789
Cache-Control: no-cache
-123456789

A boundary, as specified in the first directive column 358 of the first entry 362, and in the second directive column 360 of the second entry 364, the third entry 366, and the fourth entry 368, is an HTTP boundary. The HTTP boundary defines the end of a given section of x-mixed replace data. An exemplary HTTP boundary follows:

-123456789

A footer, as specified in the first directive column 358 of the fifth entry 370, is an HTTP footer. The HTTP footer defines the end of all x-mixed replace data. An exemplary HTTP footer follows:

-123456789—

The exemplary HTTP header may define the beginning of x-mixed replace data, the exemplary HTTP boundary may define the end of a portion of the x-mixed replace data, and the exemplary HTTP footer may define the end of all x-mixed replace data The exemplary HTTP header, the exemplary HTTP boundary, and the exemplary HTTP footer are associated with each other by the number 123456789, which appears in the second line of the exemplary HTTP header, in the exemplary HTTP boundary, and in the exemplary HTTP footer. The web browser 256 renders the display 134 (shown in FIG. 1) attached to the computer 120. (shown in FIG. 1) according to the data describing the web site, which appears after the exemplary HTTP header. If the web browser 256 receives new data from the HSML processor 254, the web browser 256 renders the display 134 according to the new data. If the web browser 256 receives an HTTP boundary, the web browser 256 "wipes" the display 134 attached to the computer 120 upon receipt of new data, and repaints the display 134 according to the data which follows the HTTP boundary. The web browser may also close its socket once it receives an HTTP footer. If the web browser 256 receives an indication that new information needs to be obtained, for example, if a user clicks on a hyper-link, the web browser 256 transmits a URL to the HSML processor 254 (shown in FIG. 2B), and it closes the old socket before opening a new connection.

A close socket, as specified in the second directive column 360 of the fifth entry 370, closes the socket to the web browser. The HSML processor 254 may not contact the web browser 256 once the socket is closed. The socket is closed by using a method close of the instance socket of the class Socket of the JAVA 2 Platform, Standard Edition, v1.2.2.

The entries in the append/prepend column 361 can have values equal to "before" and "after". Each value stored in the append/prepend column 361 indicate whether the associated first directive should be appended or prepended to the data being sent to the downstream component specified by the temporary variable DNSTR_COMP. If the entry in the append/prepend column 361 is "after", the first directive should be appended to the data received from the web server 102 (shown in FIG. 1), if however, the entry in the append/prepend column 361 is "before", the first directive should be prepended to the data received from the web server 102. The second directive should always be appended to the data received from the web server 102 (shown in FIG. 1).

The thread 300 determines whether the data received by the thread 300 during the new connection includes any HSML grammars. The thread 300 reads data from the data stream, without removing any data from the data stream, looking for an HSML grammar. After the thread 300 has reviewed the data received from the web server 102, the thread 300 appends or prepends the directives specified in the table 350 onto the data received from the web server 102 depending on whether the previous page contained an HSML grammar, the current page contained an HSML grammar, and how the current page was initiated. Once the directives are appended or prepended, the thread 300 advances to step 324.

At step 324, the thread 300 determines whether the temporary variable CUR_VOICE is equal to TRUE. If the temporary variable CUR_VOICE is equal to TRUE, the thread 300 advances to step 328. If the temporary variable CUR_VOICE is not equal to TRUE, the thread 300 advances to step 326.

At step 326, the thread 300 sets the temporary variable PREV_VOICE equal to FALSE. Once the temporary variable PREV_VOICE is set equal to FALSE, the thread 300 advances to step 330.

At step 328, the thread 300 sets the temporary variable PREV_VOICE equal to RLUE. Once the temporary variable PREV_VOICE is set equal to TRUE, the thread 300 advances to step 330.

At step 330, the thread 300 sets the temporary variable CUR_VOICE equal to FALSE. Once the temporary variable CUR_VOICE is set equal to FALSE, the thread 300 advances to step 332.

At step 332, the thread 300 determines whether the data stream, received by the thread 300 during the new connection, includes any HSML grammars. The thread 300 reads data from the data stream, without removing any data from the data stream, looking for an HSML grammar. If the thread 300 finds the beginning of any HSML grammar, HSML grammars are present in the data stream, and the thread 300 advances to step 334. The step 334 is shown in more detail in FIG. 7. Once the step 334 is completed, the thread 300 advances to step 304. If the thread 300 does not find the beginning of any HSML grammar, there are no HSML grammars in the data stream, and the thread 300 advances to step 304.

Figure 4:
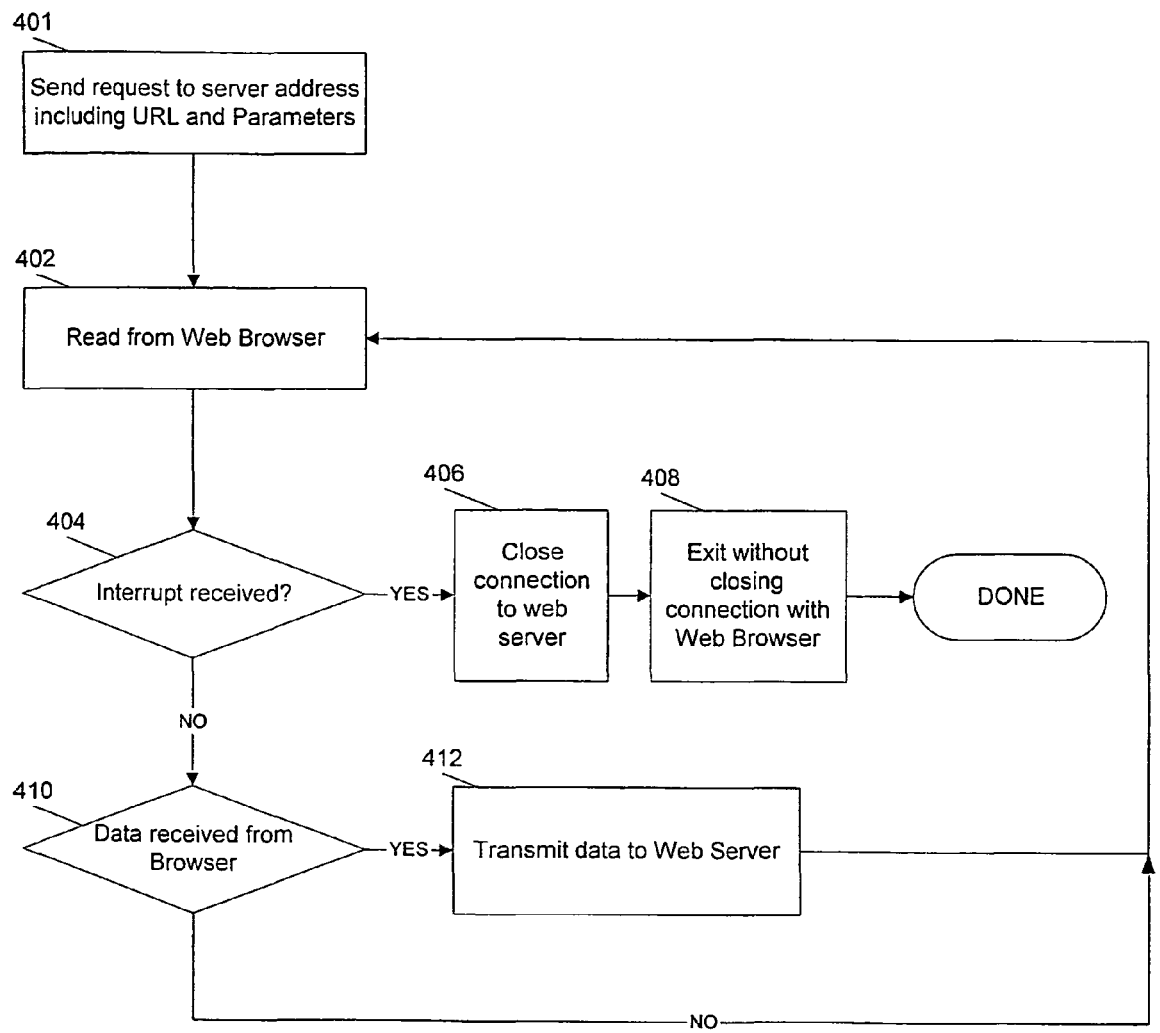
FIG. 4 is a flow chart illustrating a thread that receives data from the web browser and data sent to the web browser associated with web pages which were invoked by the web browser in accordance with the present invention.

FIG. 4 illustrates the thread 400 which begins parallel execution with thread 300 at step 316. Thread 400 receives data from the web browser 256 (shown in FIG. 2B). The thread 400 begins at step 401 by sending a request to the server address including the URL and any parameters. Once the request is sent to the server, the thread 400 advances to step 402.

At step 402, the thread 400 performs a read from the web browser 256. By reading from the web browser, the thread 400 can determine if any additional arguments are specified by the web browser 256. Once the thread 400 performs a read from the web browser 256, the thread 400 advances to step 404.

At step 404, the thread 400 determines whether an interrupt has been received by the thread 400 from thread 500, which is explained in greater detail in connection with FIG. 5. If an interrupt has been received, the thread 400 advances to step 406. If an interrupt has not been received, the thread 400 advances to step 410.

At step 406, the thread 400 closes its connection with the web server 102. Once the thread 400 closes its connection with the web server 102, the thread 400 advances to step 408.

At step 408, the thread 400 ceases further communication with the web browser 256 (shown in FIG. 2B). The thread 400 does not close the connection with the web browser 256. The connection with the web browser 256 remains open and waits for another contact from the HSML processor 254 (shown in FIG. 2B). Once the thread 400 ceases communication with the web browser 256, the thread 400 exits.

At step 410, the thread 400 determines whether additional data has been received from the web browser 256. If data has been read from the web browser 256, the thread 400 advances to step 412. If no data was received from the web browser 256, the thread 400 advances to step 402.

At step 412, the thread 400 transmits the additional arguments received from the web browser 256 to the web server 102 (shown in FIG. 1). The additional arguments should be sent to the web server 102 as arguments associated with the server name that was sent to the web server by the thread 300. After the thread 400 transmits the arguments received from the web browser 256 to the web server 102, the thread 400 advances to step 402.

Figure 7:
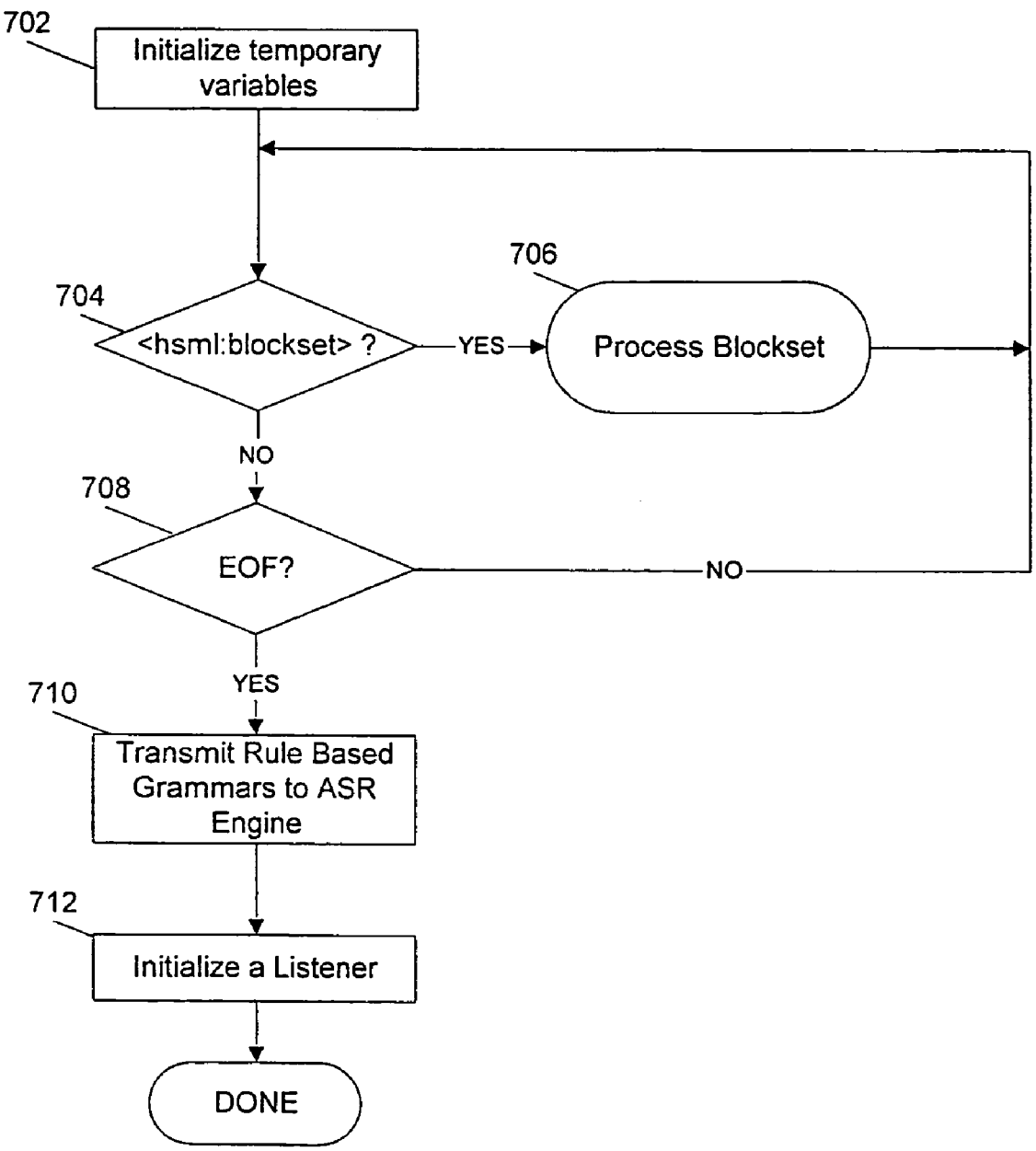
FIG. 7 is a flow chart illustrating a process for of creating, storing and transmitting rule based grammars and TTS grammars in accordance with the present invention.

FIG. 7 illustrates the procedure 334 for creating, storing and sending rule based grammars and TTS grammars in greater detail. The procedure 334 in conjunction with its sub-procedures parse the markup language of a web page extracting the HSML grammars which define the rule based grammars and the TTS grammars for that web page, which store the rule based grammars and TTS grammars, and which transmit the rule based grammars to the ASR engine 258. The procedure 334 itself, parses the markup language of the web page searching for an HSML blockset. The HSML blockset is the top level statement of any HSML grammar.

The procedure 334 begins at step 702 by initializing a temporary variable SPEECH, a temporary variable HREF, and a temporary variable ASRCMDS to null. Once the temporary variables SPEECH, HREF, and ASRCMDS are initialized the procedure 334 advances to step 704.

At step 704 the procedure 334 begins reading the markup language included in the data describing the web page. If the procedure 334 reads a string "<hsml:blockset>", the procedure 334 advances to step 706. The step 706 is shown in more detail in FIG. 8. Once the step 706 has completed, the procedure 334 advances to step 704. If the procedure 334 does not read a string "<hsml:blockset>", the procedure 334 advances to step 708.

At step 708, the procedure 334 compares what the procedure 334 has read to EOF or end of file. BOF designates when a file has come to an end. If the procedure 334 has read the EOF character, the procedure 334 advances to step 710. If the procedure 334 has not read the EOF character, the procedure 334 advances to step 704.

At step 710, the procedure 334 transmits the rule based grammars to the ASR engine 258 (shown in FIG. 2B). The process 700 uses a class library called International Business Machines Java Speech Library (IMBJS Library), version 1.0, to interface with the ASR engine 258. The procedure 334 then initializes a reader, which is a JAVA superclass, as a stringreader. The stringreader is a JAVA class and a member of the JAVA superclass reader. The reader is provided with the rule based grammars that shall be supplied to the ASR engine 258. The rule based grammars are stored in the temporary variable ASRCMDS. Once the rule based grammars are stored, the procedure 334 initializes an instance rgGram of the class Rule Grammar, which is a IBMJS class. The instance rgGram is initialized as equal to the output of the method loadJSGF which is a method of the instance recognizer of a class which implements the IBMJS Library interface Recognizer. The temporary variable ASRCMDS is provided as an argument to the method loadJSGF. The method loadJSGF transmits the rule based grammars to the ASR engine 258. Once the rule based grammars are sent to the ASR engine 258, the procedure 334 advances to the step 712.

At step 712, the procedure 334 specifies a result listener which receives output from the ASR engine 258. The result listener is bound by using the method addResultListener, which is a method of the instance rgGram of a class which implements the IBMJS Library interface Rule Grammar. Once the result listener is initialized, the procedure 334 utilizes the method commitChanges of the class which implements the IBMJS Library interface Recognizer to complete the changes specified to the ASR engine 258 and exits.

Figure 8:
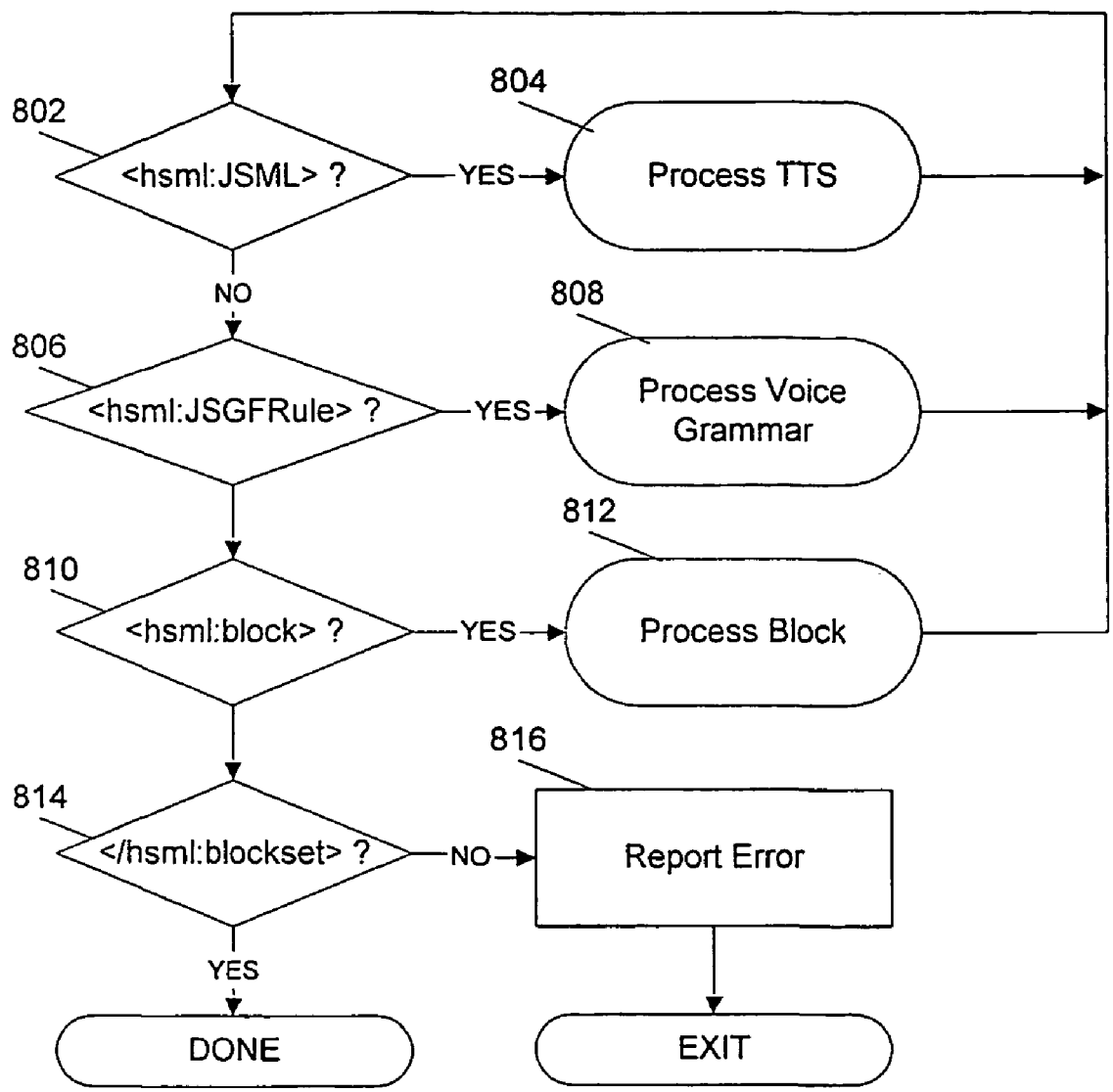
FIG. 8 is a flow chart illustrating a process for parsing block-sets of hyper-speech markup language grammars in accordance with the present invention.

FIG. 8 illustrates the procedure 706 for parsing block-sets of HSML grammars in greater detail. The procedure 706 begins at step 802 by reading the markup language included in the data describing the web page. If the procedure 706 reads a string "<hsml:JSML>", the procedure 706 advances to step 804. The step 804 is shown in more detail in FIG. 10. Once the step 804 has completed, the procedure 706 advances to step 802. If the procedure 706 does not read a string "<hsml:JSML>", the procedure 706 advances to step 806.

At the step 806, the procedure 706 compares what the procedure 706 has read to the string "<hsml:JSGFRule>". If the procedure 706 has read the string "<hsml:JSGFRule>", the procedure 706 advances to step 808. The step 808 is shown in more detail in FIG. 11. Once the step 808 has completed, the procedure 706 advances to step 802. If the procedure 706 has not read the string "<hsml:JSGFRule>", the procedure 706 advances to step 810.

At the step 810, the procedure 706 compares what the procedure 706 has read to the string "<hsml:block>". If the procedure 706 has read the string "<hsml:block>", the procedure 706 advances to step 812. The step 812 is shown in more detail in FIG. 9. Once the step 812 is completed, the procedure 706 advances to step 802. If the procedure 706 has not read the string "<hsml:block>", the procedure 706 advances to step 814.

At the step 814, the procedure 706 compares what the procedure 706 has read to the string "<hsml:blockset>". If the procedure 706 has read the string "</hsml:blockset>", the procedure 706 is complete and the procedure 706 exits. If the procedure 706 has not read the string "</hsml:blockset>", the procedure 706 advances to step 816.

At the step 816 the procedure 706 reports an error in the markup language of the data describing the web page. If the string "</hsml:blockset>" does not appear at this point, an error should be reported Once the error is reported, the procedure 706 exits, and in turn the procedure 334 exits.

Figure 9:
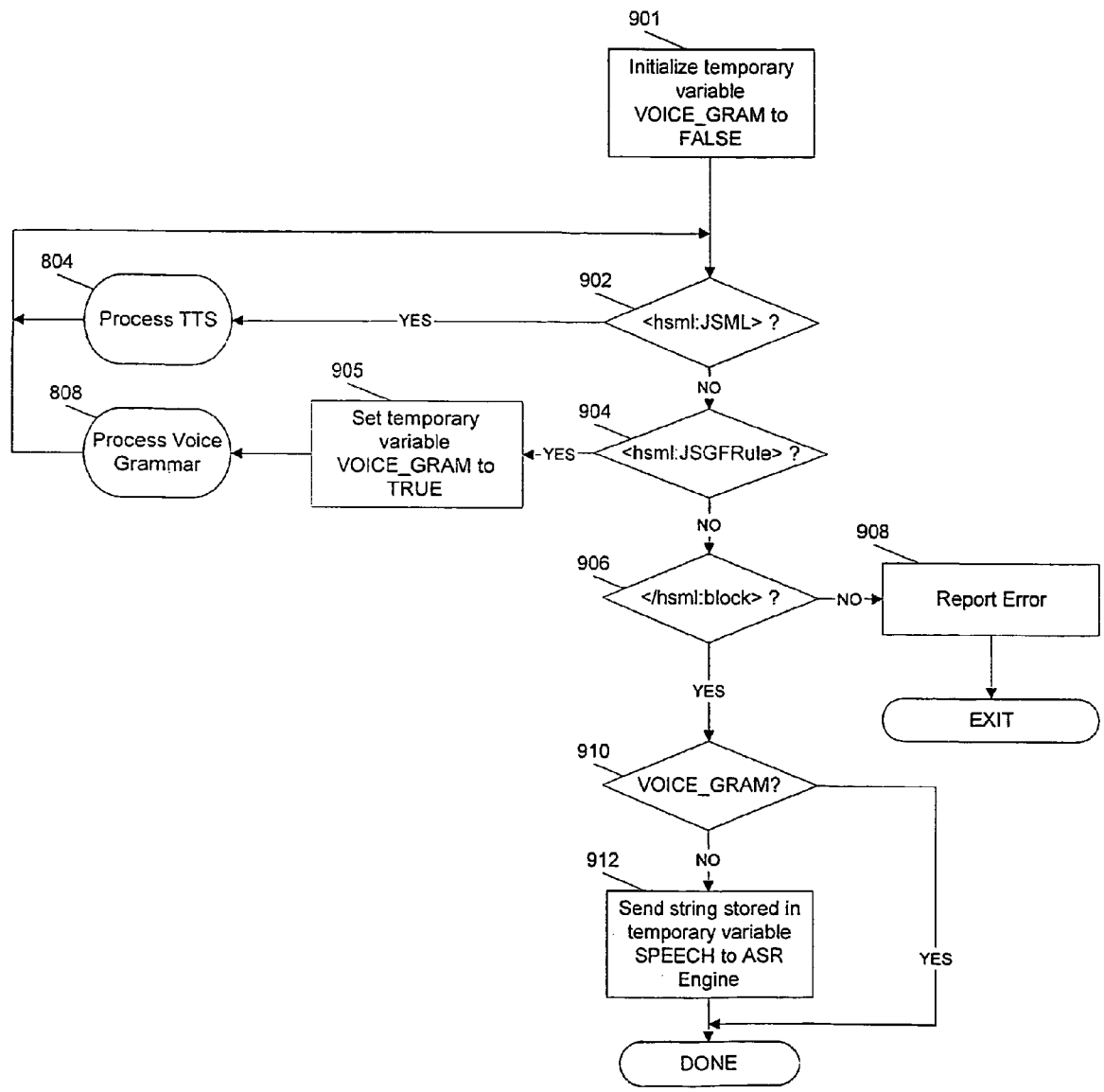
FIG. 9 is a flow chart illustrating a process for parsing blocks of hyper-speech markup language grammars in accordance with the present invention.

FIG. 9 illustrates the procedure 812 for parsing blocks of HSML grammars in greater detail. The procedure 812 begins at step 901 where the procedure 812 initializes the temporary variable VOICE_GRAM to FALSE. Once the temporary variable VOICE_GRAM is initialized, the procedure 812 advances to step 902.

At step 902, the procedure 812 reads the markup language included in the data describing the web page. If the procedure 812 reads a string "<hsml:JSML>", the procedure 812 advances to step 804. The step 804 is shown in more detail in FIG. 10. Once the step 804 is completed, the procedure 812 advances to step 902. If the procedure 812 does not read the string "<hsml:JSML>", the procedure 812 advances to step 904.

At step 904, the procedure 812 continues to read the markup data included with the data. If the procedure 812 has read a string matching the string "<hsml:JSGFRule>", the procedure 812 advances to step 905. If the procedure 812 has not read a string matching the string "<hsml:JSGFRule>", the procedure 812 advances to step 906.

At step 905, the procedure 812 sets the temporary variable VOICE_GRAM equal to TRUE to signify that a rule based grammar is present in the HSML block. Once the temporary variable VOICE_GRAM is set, the procedure 812 advances to step 808. The step 808 is shown in more detail in FIG. 10. Once the step 808 is completed, the procedure 812 advances to step 902.

At step 906, the procedure 812 compares what the procedure 812 has read to the string "<hsml:block>". If the procedure 812 has read a string matching the string "</hsml:block>", the procedure 812 advances to step 910. If the procedure 812 has not read a string matching the string "</hsml:block>", the procedure 812 advances to step 908.

At the step 908 the procedure 812 reports an error in the markup language of the data describing the web page. If the string "<hsml:block>" does not appear at this point, an error in the markup language should be reported. Once the error is reported, the procedure 812 exits, and in turn the processes 334 and 706 exit.

At step 910, the procedure 812 determines whether the temporary variable VOICE_GRAM is equal to TRUE. If the temporary variable VOICE_GRAM is equal to FALSE, the procedure 812 advances to step 912. If the temporary variable VOICE_GRAM is not equal to FALSE, the procedure 812 exits.

At step 912, the procedure 812 transmits a Java speech grammar format rules (JSGF rules) corresponding to the string stored in the temporary variable SPEECH to the ASR engine 258. The string stored in the temporary variable SPEECH is provided to a method speak of the instance synthesizer of a class which implements the IBMJS Library interface Synthesizer. Once the JSGF rule is transmitted to the ASR engine 258 (shown in FIG. 2B), the procedure 812 exits.

Figure 10:
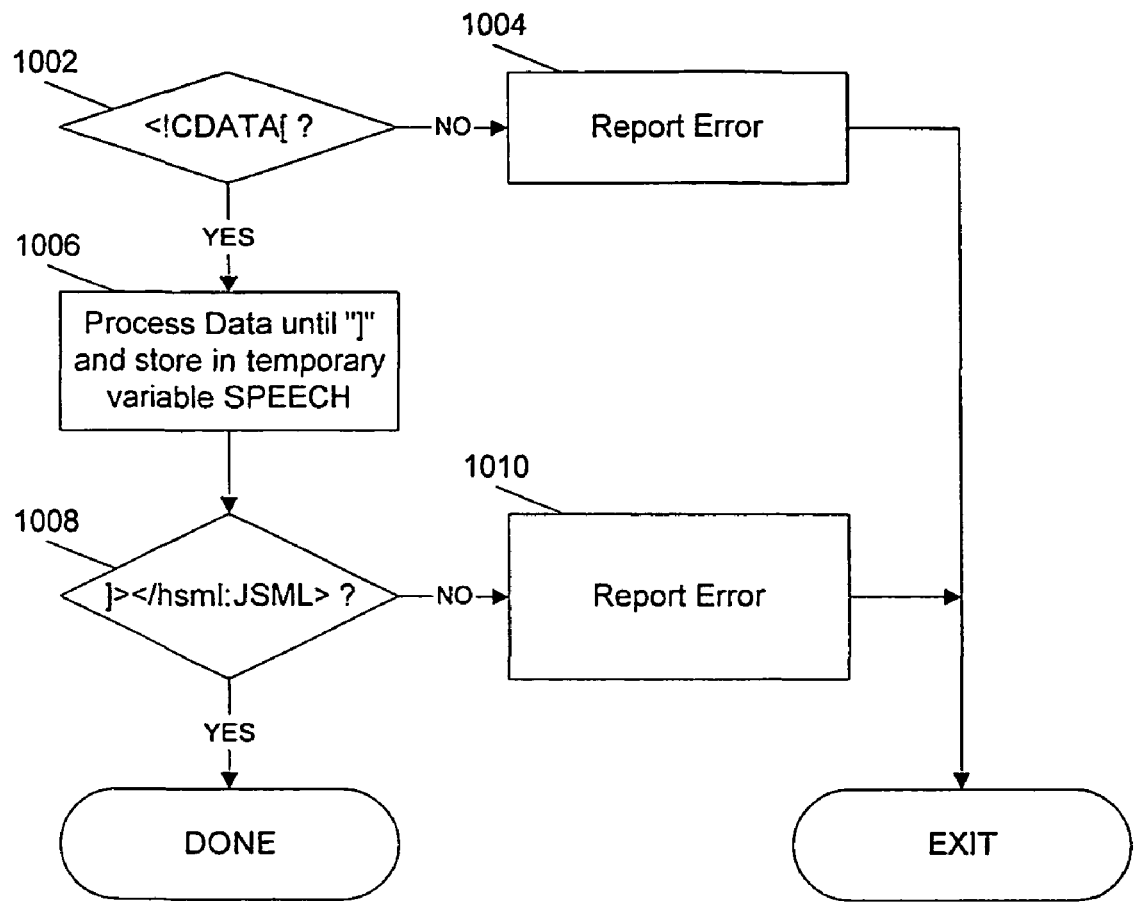
FIG. 10 is a flow chart illustrating a process for parsing hyper-speech markup language text-to-speech grammars in accordance with the present invention.

FIG. 10 illustrates the procedure 804 for parsing HSML TTS grammars in greater detail. The procedure 804 begins at step 1002 by reading the markup language included in the data describing the web page. If the procedure 804 reads a string "<!CDATA[", the procedure 804 advances to step 1006. If the procedure 804 does not read a string "<!CDATA[", the procedure 804 advances to step 1004.

At the step 1004 the procedure 804 reports an error in the markup language of the data describing the web page. If the string "<hsml:JSML>" is not followed by the string "<!CDATA[" an error should be reported. Once the error is reported, the procedure 804 exits, and in turn the processes 334 and 706 exit, and, if running, the procedure 812 exits.

At step 1006, the procedure 804 captures the text of the markup language included in the data describing the web page until the procedure 804 reads a "]". The captured markup language is stored in the temporary variable SPEECH as a string. Once captured markup language is stored in the temporary variable SPEECH, the procedure 804 advances to step 1008.

At step 1008, the procedure 804 continues to read the markup language included with the data describing the web site. If the procedure 804 has read a string matching the string "]></hsml:JSML>", the procedure 804 is complete and the procedure 804 exits. If the procedure 804 has not read a string matching the string "]><hsml:JSML>", the procedure 804 advances to step 1010.

At the step 1010 the procedure 804 reports an error in the markup language of the data describing the web page. If the string "]" is not followed by the string "]></hsml:JSML>" an error should be reported. Once the error is reported, the procedure 804 exits, and in turn the processes 334 and 706 exit, and, if running, the procedure 812 exits.

Figure 11:
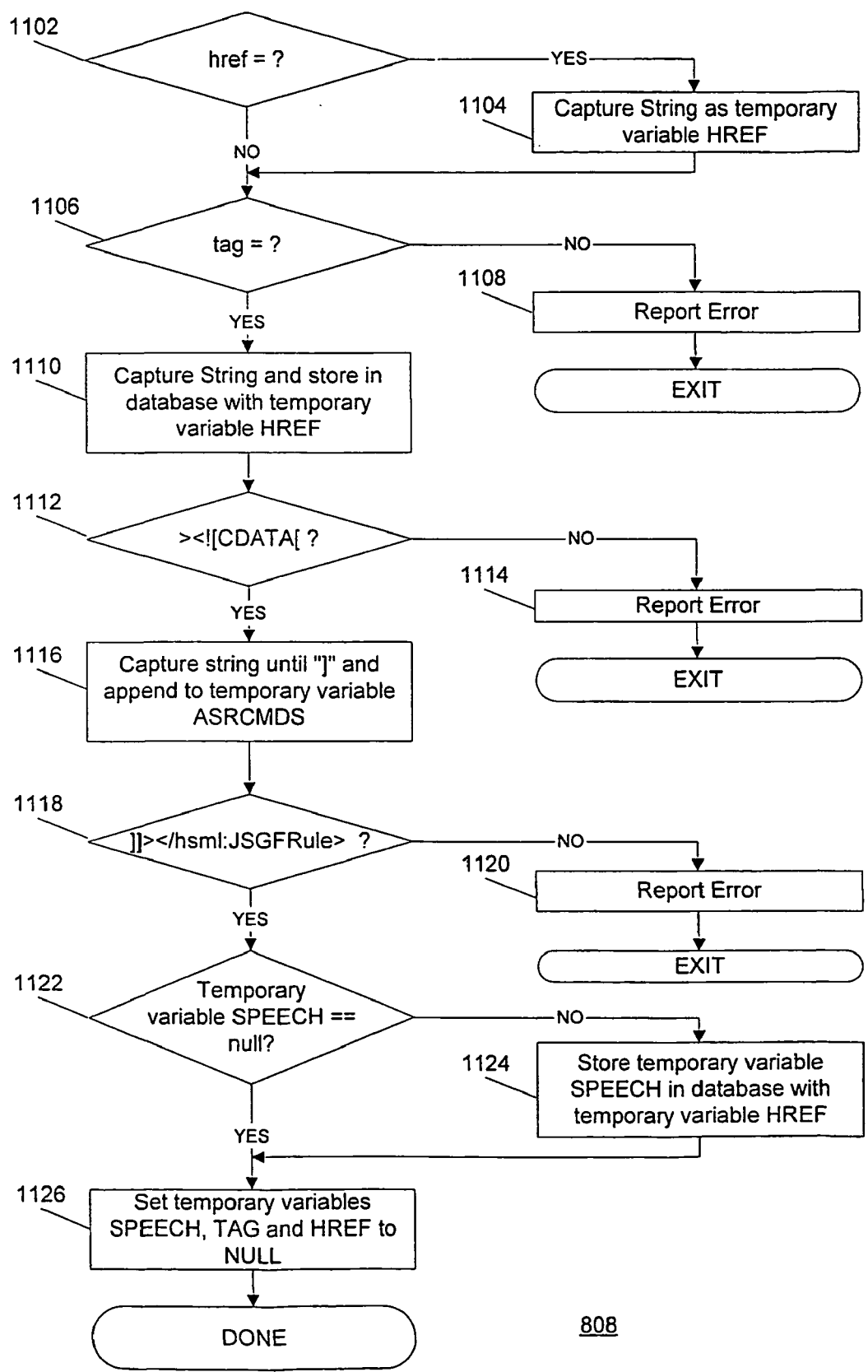
FIG. 11 is a flow chart illustrating a process for parsing hyper-speech markup language rule based grammars in accordance with the present invention.

FIG. 11 illustrates the procedure 808 for parsing HSML rule based grammars in greater detail. The procedure 808 begins at step 1102 by reading the markup language included in the data describing the web page. If the procedure 808 reads a string "href=", the procedure 808 advances to step 1104. If the procedure 808 does not read a string "href=", the procedure 808 advances to step 1106.

At step 1104, the procedure 808 captures the text of the markup language included in the data describing the web page until the procedure 808 reads an entire string bounded by double quotes, for example, in the first example HSML rule based grammar, "www.columbia.edu". The captured markup language included in the data describing the web page is stored in the temporary variable HREF as a string. Once the captured markup language is stored in the temporary variable HREF, the procedure 808 advances to step 1106.

At step 1106, the procedure 808 continues to read the markup language included with the data describing the web site. If the procedure 808 has read a string matching the string "tag=", the procedure 808 advances to step 1110. If the procedure 808 has not read a string matching the string "tag=", the procedure 808 advances to step 1108.

At the step 1108 the procedure 808 reports an error in the markup language of the data describing the web page. If the string "tag=" is not present in the markup language at this point an error should be reported. Once the error is reported, the procedure 808 exits, and in turn the processes 334 and 706 exit, and, if running, the procedure 812 exits.

At step 1110, the procedure 808 captures the text of the markup language included in the data describing the web page until the procedure 808 reads an entire string bounded by double quotes, for example, in the first example HSML rule based grammar, "reload". The captured markup language included in the data describing the web page is stored in the temporary variable TAG as a string. After the captured markup language is stored in the temporary variable TAG, the procedure 808 creates a new record in a database located on the data storage unit 126 (shown in FIG. 1). The new record includes a first field, a second field and a third field. The first field is populated with the string stored in the temporary variable TAG, the second field is populated with the string "HREF", and the third field is populated with the string stored in the temporary variable HREF. After the first database record is populated, the procedure 808 advances to step 1112.

In an alternate embodiment, the string "tag=" and associated tag may be eliminated from the HSML rule, but there should be at least one string "tag=" and associated tag per grammar.

At step 1112, the procedure 808 continues to read the markup language included with the data describing the web site. If the procedure 808 has read a string matching the string "><![CDATA[", the procedure 808 advances to step 1116. If the procedure 808 has not read a string matching the string "><![CDATA[", the procedure 808 advances to step 1114.

At the step 1114 the procedure 808 reports an error in the markup language of the data describing the web page. If the string "><![CDATA[" is not present in the markup language at this point an error should be reported. Once the error is reported, the procedure 808 exits, and in turn the processes 334 and 706 exit, and, if running, the procedure 812 exits.

At step 1116, the procedure 808 captures the text of the markup language included in the data describing the web page until the procedure 808 reads "]". The captured markup language included in the data describing the web page is stored in the temporary variable ASRCMDS as text, and a carriage return character is appended to the end of the captured text. Once the text is stored in the temporary variable ASRCMDS, the procedure 808 advances to step 1118.

At step 1118, the procedure 808 continues to read the markup language included with the data describing the web site. If the procedure 808 has read a string matching the string "]]></hsml:JSGFRule>", the procedure 808 advances to step 1122. If the procedure 808 has not read a string matching the string "]]></hsml:JSGFRule>", the procedure 808 advances to step 1120.

At the step 1120 the procedure 808 reports an error in the markup language of the data describing the web page. If the string "]]><hsml:JSGFRule>" is not present in the markup language at this point an error should be reported. Once the error is reported, the procedure 808 exits, and in turn the processes 334 and 706 exit, and, if running, the procedure 812 exits.

At step 1122, the procedure 808 compares the temporary variable SPEECH to NULL. If the temporary variable SPEECH is equal to NULL, the procedure 808 advances to step 1126. If the temporary variable SPEECH is not equal to NULL, the procedure 808 advances to the step 1124.

At step 1124, the procedure 808 creates another new record in the database located on the data storage unit 126 (shown in FIG. 1). This new record includes a first field, a second field, and a third field. The first field is populated with the string stored in the temporary variable TAG, the second field is populated with the string "SPEECH", and the third field is populated with the string stored in the temporary variable SPEECH. After this new record is populated, the procedure 808 advances to step 1126.

At step 1126, the procedure 808 resets some of the temporary variables. The temporary variables SPEECH, TAG and HREF are set equal to NULL. Once these temporary variables are set equal to NULL, the procedure 808 is complete and it exits.

FIG. 5 illustrates the thread 500 that receives arrays of tags from the ASR engine 258 (shown in FIG. 2B). More particularly, the thread 500 receives arrays of tags from the ASR engine 258, constructs full URLs based upon the arrays of tags received from the ASR engine 258, and transmits the full URLs to the web server. Each tag of an array corresponds to a grammar rule that has been invoked within the ASR engine 258.

The thread 500 begins at step 502 by determining whether any system commands exist within the array of tags received from the ASR engine 258. If any system commands have been received, the thread 500 advances to step 504. If no system commands have been received, the thread 500 advances to step 506.

At step 504, the thread 500 executes any system commands received by the thread 500. System commands are system level commands that are invoked by rule based grammars stored in the ASR engine 258, for example, exit The rule based grammars, associated with system commands are always active in the ASR engine 258 no matter which web page is currently active. In the case of the system command exit, the ASR engine 258 will attempt to match any utterance to the string "exit", regardless of which web page is currently being viewed. If the rule based grammar associated with the string "exit" is invoked, the ASR engine 258 issues an array of tags, one of which is associated with the system command exit, and the thread 500 executes the system commands. Once the system commands have been executed, the thread 500 advances to step 502.

At step 506, the thread 500 searches the database located on the data storage device 126 (shown in FIG. 1) for database records with a first tag of the list of tags stored in the first field of the database records. If the database contains no records where the first field of the database record matches the first tag of the array of tags, or more than two records where the first field of the database records matches the first tag of the array of tags, the database contains an inappropriate number of database records and the thread 500 advances to step 508. If the database contains one or two records where the first field of the database records matches the first tag of the array of tags, the database contains an appropriate number of database records and the thread 500 advances to step 510.

At the step 508 the thread 500 reports an error in the markup language of the data describing the web page. If the database does not contain any records corresponding to the first tag of the array of tags or the database contains more than two records corresponding to the first tag of the array of tags, an error should be reported. Once the error is reported, the thread 500 exits, and in turn the thread 300 exits.

At step 510, the thread 500 searches the database located on the data storage device 126 (shown in FIG. 1) for a database record with a string matching the first tag of the array of tags stored in the first field of the database record and the string "SPEECH" stored in the second field of the database record. If the thread 500 finds such a database record, the thread 500 advances to step 512. If the thread 500 does not find such a database record, the thread 500 advances to step 514.

At step 512, the thread 500 transmits a JSGF rule corresponding to the string stored in the third field of the of the database record found during the step 510 to the ASR engine 258 (shown in FIG. 2B). The string stored in the third field of the database record found during the step 510 is provided to a method speak of the instance synthesizer of a class which implements the IBMJS Library interface Synthesizer. Once the JSGF rule is transmitted to the ASR engine 258, the thread 500 advances to step 514.

At step 514, the thread 500 determines whether the temporary variable PREV_VOICE is set equal to TRUE. If the temporary variable PREV_VOICE is set equal to TRUE, the thread 500 advances to step 518. If the temporary variable PREV_VOICE is not set equal to TRUE, the thread 500 advances to step 516.

At step 516, the thread 500 assigns the value of a temporary variable DNSTR_COMP_2 equal to the value of the temporary variable DNSTR_COMP. The temporary variable DNSTR_COMP_2 now represents the socket of the downstream component, which will be used by a thread 600, described in greater detail in relation to FIG. 6, to transmit data to the web browser. Once the value of the temporary variable DNSTR_COMP_2 is updated, the thread 500 advances to step 518.

At step 518, the thread 500 sets the temporary variable CUR_VOICE equal to TRUE Once the temporary variable CUR_VOICE is set equal to TRUE, the thread 500 advances to step 520.

At step 520, the thread 500 determines whether the thread 400 is currently running. If the thread 400 is currently running, the thread 500 advances to step 522. If the thread 400 is not currently running, the thread 500 advances to step 524.

At step 522, the thread 500 transmits an interrupt to thread 400. The interrupt will cause the thread 400 to exit without closing its connection with the web browser 256. Once the interrupt is sent to the thread 400, the thread 500 advances to step 524.

At step 524, the thread 500 searches the database located on the data storage device 126 (shown in FIG. 1) for a database record with the first tag of the array of tags stored in the first field of the database record and the string "HREF" stored in the second field of the database record. If the thread 500 finds such a database record, the thread 500 stores the string stored in the third field of the database record in a temporary variable and appends any tags received from the ASR engine 258 onto the string stored in the temporary variable. Once the tags are appended, the thread 500 transmits the string stored in the temporary variable to the thread 300. After the string is sent to thread 300, the thread 500 advances to step 526.

At step 526, the thread 500 causes the thread 600 to begin execution. Once the thread 600 begins execution, the thread 500 exits.

Figure 6:
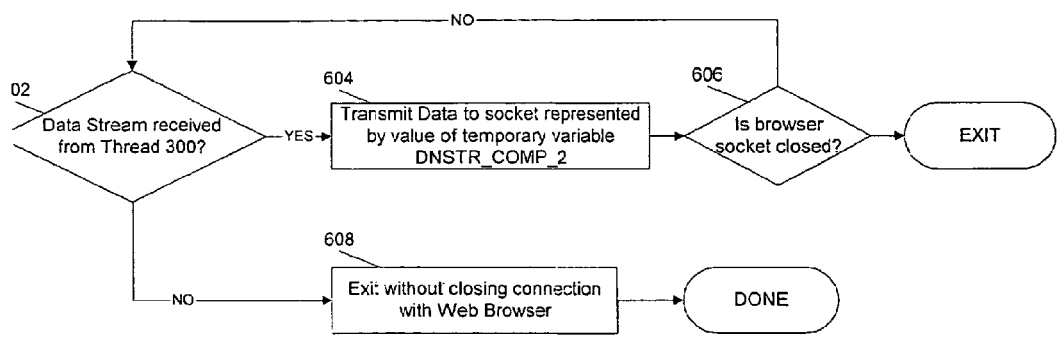
FIG. 6 is a flow chart illustrating a thread that receives sub-rule tags from the ASR engine and data sent to the web browser associated with web pages which were invoked by the ASR engine in accordance with the present invention.

FIG. 6 illustrates a thread 600 that receives and transmits data sent to the web browser 256 (shown in FIG. 2B) associated with web pages which were invoked by the ASR engine 258. The thread 600 begins at step 602 by determining whether a data stream has been received by the thread 600. If a data stream has been received, the thread 600 advances to step 604. If a data stream has not been received, the thread 600 advances to step 608.

At step 604, the thread 600 must transmit the data contained within the data stream received from thread 300 to the socket specified in the temporary variable DNSTR_OMP_2. Once the data received by the thread 600 is transmitted to the web browser 256, the thread 600 advances to step 606.

At step 606, the thread 600 determines whether the browser socket specified by the temporary variable DNSTR_COMP_2 is closed. If the thread 600 receives an error when it attempts to transmit data to the value of the browser socket variable at step 604, the browser socket is closed and the thread 600 must exit. If the thread 600 does not receive an error, the browser socket is open and the thread 600 advances to step 602.

At step 608, the thread 600 ceases further communication with the web browser 256. The thread 600 does not close the connection with the web browser 256. The connection with the web browser 256 remains open and waits for contact from another process. Once the thread 600 ceases communication with the web browser 256, the thread 600 exits.

In an alternate embodiment, the HSML processor 254 (shown in FIG. 2B) may receive data describing a web page with multiple frames included within that web page. Each frame may include a different set of HSML rule based grammars and HSML TTS grammars. The HSML processor 254 can be configured to monitor multiple sets of HSML rule based grammars and HSML TTS grammars.

The invention claimed is:

1. A computer-implemented method for providing a visual web page having an audio interface, comprising one or more computer processors performing the following:
receiving, at a browser, a first web page transmitted from a server, the first web page including a page mark-up that includes both first components parseable into a first visual web page and second components parseable into a first rule based grammar generated irrespective of content of the first components, the second components that are parseable into the first rule based grammar being specified by a speech markup language;
traversing the first web page;
during the traversal of the first web page, identifying which of the components of the first web page are the first components parseable into the first visual web page and which of the components of the first web page are the second components parseable into the first rule based grammar;
parsing the first components into a display of the first visual web page;
parsing the second components into the first rule based grammar; and
loading the first rule based grammar into memory in association with the first visual web page.

2. The method of claim 1, wherein each rule of the first rule based grammar includes a first command portion identifying a command to be performed when the respective rule of the first rule based grammar is invoked, a first phrase portion identifying at least one phrase which invokes the respective rule of the first rule based grammar, and a first tag portion which uniquely identifies the respective rule of the first rule based grammar.

3. The method of claim 2, wherein:
the page mark-up of the first web page further includes third components parseable into a speech grammar which includes rules for outputting audio;
each rule of the speech grammar is associated with a tag portion; and
a particular rule of the speech grammar is loaded into the memory in association with a particular rule of the first rule based grammar by use of a same tag portion by the particular rules of the speech grammar and the first rule based grammar.

4. The method of claim 3, further comprising:
responsive to receipt, while the first visual web page is active, of a voice command matching the first phrase portion of the particular rule of the first rule based grammar, executing the command of the particular rule of the first rule based grammar and outputting the audio of the particular rule of the speech grammar.

5. The method of claim 2, wherein the first phrase portion of each of at least one rule of the first rule based grammar identifies a respective plurality of phrases which invoke the respective rule, at least one of the respective plurality of phrases being different from any text of the first visual web page via interaction with which the respective rule is invocable.

6. The method of claim 5, further comprising:
displaying a list of the respective plurality of phrases.

7. The method of claim 1, further comprising:
determining whether to add one or more directives to data of the received first web page, and, where it is determined that one or more directives are to be added, whether the one or more directives are to be appended or prepended, wherein the determinations are based on whether a current received web page includes a grammar, on whether a previously received web page includes a grammar, and on a method via which the current page was initiated.

8. The method of claim 1, wherein the second components include a component that provides a speech-invoked reload instruction for reloading the first visual web page.

9. The method of claim 1, wherein each of at least a subset of rules of the first rule based grammar includes a start tag, an association of a Uniform Resource Locator, at least one speech element for invoking a command, and an end tag.

10. The method of claim 1, further comprising:
opening a connection to the browser from the server; and
sending the first text content to the browser over the connection.

11. The method of claim 10, wherein the connection is a persistent connection.

12. The method of claim 11, further comprising:
parsing a received voice command in accordance with the first rule based grammar;
requesting a second web page from the server responsive to the voice command;
receiving a second data from the server, the second data specifying the second web page;
parsing the second data into a second text content and a second rule based grammar;

loading the second rule based grammar; and
sending the second text content to the browser over the connection.

13. The method of claim 12, wherein the voice command is an instruction to the server.

14. The method of claim 1, wherein the first text content includes markup language.

15. The method of claim 14, wherein the markup language is Hypertext Markup Language.

16. The method of claim 1, wherein the first rule based grammar includes a first display priority portion.

17. The method of claim 1, further comprising:
receiving from an automated speech recognition engine an indication a first grammar rule has been invoked by a voice command, the first grammar rule included in the first rule based grammar; and
transmitting the voice command to a web server.

18. The method of claim 1, further comprising:
displaying an output audio level.

19. The method of claim 1, further comprising:
displaying a first phrase portion of the first rule based grammar.

20. The method of claim 1, further comprising:
parsing the first data into a first speech based grammar.

21. The method of claim 20, further comprising:
audibly outputting the first speech based grammar at a browser displaying the first web page.

22. The method of claim 21, wherein the outputting occurs responsive to receiving a voice command.

23. The method of claim 1, wherein the parsing occurs at a browser.

24. The method of claim 1, wherein the grammar components are given by binary data.

25. A computer-implemented method for displaying a visual web page having an audio interface, comprising one or more computer processors performing the following:
receiving, at a browser and from a web server, a first web page including a page mark-up that includes both first components parseable into a first visual web page and second components parseable into a first rule based grammar generated irrespective of content of the first components, wherein the first rule based grammar is specified by a speech markup language;
opening a connection between the browser and a module;
traversing the first web page;
during the traversal, identifying which of the components of the first web page are the first components parseable into the first visual web page and which of the components of the first web page are the second components parseable into the first rule based grammar;
parsing the second components into the first rule based grammar;
loading the first rule based grammar into a memory accessible by the module in association with the first visual web page;
sending the first components to the browser over the connection;
displaying the first visual web page at the browser;
processing a received voice command at the module in accordance with the first rule based grammar; and
displaying, at the browser, a second visual web page received responsive to the command.

26. The method of claim 25, wherein the voice command is processed at an automated speech recognition engine.

27. The method of claim 25, wherein the first text content and the second text content include Hypertext Markup Language.

28. The method of claim 25, further comprising:
loading a second rule based grammar received with the second text content.

29. The method of claim 25, further comprising:
parsing first data into a first speech based grammar.

30. The method of claim 29, further comprising:
audibly outputting the first speech based grammar at the browser.

31. The method of claim 30, wherein the outputting occurs in response to receiving a voice command.

32. The method of claim 25, wherein the processing occurs at the browser.

33. A system for providing a visual web page having an audio interface, comprising:
an input arrangement for receiving, from a server, a first web page including a page mark-up that includes first components including verbal components parseable into a visual web page and second components parseable into a first rule based grammar generated irrespective of content of the first components, wherein the second components that are parseable into the first rule based grammar are specified by a speech markup language;
a browser for traversing the first web page, wherein, during the traversal of the first web page, the browser identifies which of the components of the first web page are the first components parseable into the first visual web page and which of the components of the first web page are the second components parseable into the first rule based grammar;
a module for parsing the identified second components into the first rule based grammar, the first rule based grammar including rules that each includes a first command portion identifying a command to be performed upon invocation of the respective rule and a first tag portion which uniquely identifies the respective rule; and
a database for storing at least a portion of the first rule based grammar in association with the first visual web page.

34. The system of claim 33, wherein the data specifying the web page includes Hypertext Markup Language.

35. The system of claim 33, wherein the module processes a voice command in accordance with the first rule based grammar.

36. The system of claim 35, wherein the input receives a second rule based grammar responsive to the voice command.

37. The system of claim 33, wherein the first text content data further specifies a first speech based grammar associated with the web page.

38. The system of claim 37, further comprising:
an output configured to audibly output a first speech output in accordance with the first speech based grammar.

39. The system of claim 38, wherein the first speech output is outputted in response to receiving a voice command.

40. The system of claim 33, wherein the module is included in the browser.

41. A computer-implemented method to provide a visual web page having an audio interface, comprising one or more computer processors performing the following:
receiving, at a browser, a web page transmitted from a server, the web page including a page markup that includes both first markup components specifying, describing, and parseable into a visual web page and second markup components specifying, describing, and parseable into: a rule based grammar generated irrespective of content of the first markup components, a structure of the rule based grammar, and associated web resources of the rule based grammar;

traversing the web page;

during the traversal of the web page, identifying which of the components of the web page are the first markup components and which of the components of the web page are the second markup components;

parsing the first components into a display of the visual web page;

parsing the second components into relations including the rule based grammar and web resources;

associating the web resources with rules of the rule based grammar as specified by the markup; and loading the rule based grammar and associated resources into memory in relation to the visual web page.

42. The method of claim 41, further comprising:

responding to user interaction with the visual web page in accordance with the loaded rule based grammar to provide an updated display.

* * * * *

UNITED STATES PATENT AND TRADEMARK OFFICE
CERTIFICATE OF CORRECTION

PATENT NO. : 7,640,163 B2  Page 1 of 1
APPLICATION NO. : 10/432188
DATED : December 29, 2009
INVENTOR(S) : Charney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1510 days.

Signed and Sealed this

Ninth Day of November, 2010

David J. Kappos
*Director of the United States Patent and Trademark Office*